United States Patent
Yost et al.

(10) Patent No.: US 12,227,439 B2
(45) Date of Patent: Feb. 18, 2025

(54) SYSTEMS TO TREAT PFAS AND OTHER PERSISTENT ORGANIC COMPOUNDS AND OXIDIZABLE MATTER IN AQUEOUS FLUIDS

(71) Applicant: Yost Brothers, LLC, Anacortes, WA (US)

(72) Inventors: Karl William Yost, Anacortes, WA (US); Richard W. Alexander, Lebanon, OR (US)

(73) Assignee: YOST BROTHERS, LLC, Anacortes, WA (US)

( * ) Notice: Subject to any disclaimer, the term of this patent is extended or adjusted under 35 U.S.C. 154(b) by 554 days.

(21) Appl. No.: 16/833,183

(22) Filed: Mar. 27, 2020

(65) Prior Publication Data

US 2020/0399147 A1    Dec. 24, 2020

Related U.S. Application Data

(60) Provisional application No. 62/826,859, filed on Mar. 29, 2019.

(51) Int. Cl.
    *C02F 1/467*      (2023.01)
    *C02F 101/36*     (2006.01)

(52) U.S. Cl.
    CPC ........ *C02F 1/4672* (2013.01); *C02F 2101/36* (2013.01); *C02F 2201/4611* (2013.01); *C02F 2201/4618* (2013.01); *C02F 2301/022* (2013.01)

(58) Field of Classification Search
    CPC ............... C02F 1/4672; C02F 2101/36; C02F 2201/4611; C02F 2201/4618;
(Continued)

(56) References Cited

U.S. PATENT DOCUMENTS

| | | |
|---|---|---|
| 691,802 A | 1/1902 | Patton |
| 2,018,082 A | 10/1935 | Muench |

(Continued)

FOREIGN PATENT DOCUMENTS

| | | |
|---|---|---|
| CN | 101774715 A1 | 7/2010 |
| CN | 103232095 A1 | 8/2013 |

(Continued)

OTHER PUBLICATIONS

International Search Report and Written Opinion for PCT/US2020/025482 filed on Mar. 27, 2020, Applicant: Yost, Karl William et al., dated Jul. 24, 2020, 10 pages.

(Continued)

*Primary Examiner* — Hayden Brewster
(74) *Attorney, Agent, or Firm* — Perkins Coie LLP

(57) ABSTRACT

Devices, apparatus, and methods to treat Per- and polyfluoroalkyl substances (PFAS) and related telomeres including perfluorooctanoic acid (PFOA) and Perfluorooctanesulfonic (PFOS), and other recalcitrant highly stable organic compounds, substances, organic matter, infectious fluids, bacteria, viruses and other pathogens, endocrine disruptors, pharmaceutical, and otherwise oxidizable material contaminants in water, aqueous fluids, condensates, concentrates, brines, and spent solid adsorbent media. The system can include hydrodynamic cavitation; acoustic sonication; electrochemical oxidation; in-line static mixing; and supplemental reagent precursors to create powerful oxidizing conditions within the equipment, and oxidants by the system that destroy said contaminants.

12 Claims, 20 Drawing Sheets

(58) Field of Classification Search
CPC ............... C02F 2301/022; C02F 1/722; C02F 2103/06; C02F 1/34; C02F 1/36; C02F 1/78; C02F 2001/46147
See application file for complete search history.

(56) References Cited

U.S. PATENT DOCUMENTS

| | | | |
|---|---|---|---|
| 2,514,126 A | 7/1950 | Fischer | |
| 2,628,080 A | 2/1953 | Mack | |
| 2,689,713 A | 9/1954 | Staller | |
| 2,841,370 A | 7/1958 | Cosmetto | |
| 2,901,227 A | 8/1959 | Russum | |
| 3,134,578 A | 5/1964 | Martin | |
| 3,381,944 A | 5/1968 | Clary | |
| 3,388,893 A | 6/1968 | Hall | |
| 3,992,148 A | 11/1976 | Shore | |
| 5,971,602 A | 10/1999 | Dorn | |
| 6,123,816 A | 9/2000 | Hodgson | |
| 6,334,985 B1* | 1/2002 | Raghuram | F28D 9/0006 422/224 |
| 7,326,330 B2 | 2/2008 | Herrington et al. | |
| 11,059,008 B2 | 7/2021 | Alexander et al. | |
| 11,680,001 B2 | 6/2023 | Yost et al. | |
| 2002/0145938 A1 | 10/2002 | Sasaki | |
| 2010/0140107 A1 | 6/2010 | Sloan | |
| 2011/0024361 A1* | 2/2011 | Schwartzel | C02F 1/467 204/290.01 |
| 2013/0118994 A1 | 5/2013 | Altman | |
| 2014/0048466 A1* | 2/2014 | McGuire | C02F 1/4672 210/170.09 |
| 2017/0081227 A1 | 3/2017 | Riffe | |
| 2019/0118149 A1 | 4/2019 | Alexander et al. | |

FOREIGN PATENT DOCUMENTS

| | | |
|---|---|---|
| CN | 203448002 U * | 2/2014 |
| DE | 102015006706 A1 | 11/2016 |
| JP | 2011045873 A1 | 3/2011 |
| JP | 2012172664 A1 | 12/2012 |
| JP | 2014065010 A1 | 4/2014 |
| JP | 5728667 B2 | 4/2015 |
| JP | 2016016390 A1 | 2/2016 |
| KR | 20080040659 A1 | 5/2008 |
| SU | 1243797 A1 | 7/1986 |
| SU | 1368015 A1 | 1/1988 |
| WO | 2008150541 A1 | 12/2008 |
| WO | 2012112029 A1 | 8/2012 |
| WO | 2018035474 A1 | 2/2018 |
| WO | 2018053630 A1 | 3/2018 |

OTHER PUBLICATIONS

Examination Report mailed Aug. 9, 2022 in Australian Patent Application No. 2020252070, 3 pages.
International Search Report and Written Opinion mailed Apr. 3, 2019 in International Patent Application No. PCT/US18/56938, 14 pages.
International Search Report and Written Opinion mailed Jun. 13, 2019 in International Patent Application No. PCT/US19/22622, 6 pages.
Notice of Requisition mailed Jul. 25, 2022 in Canadian Patent Application No. 3,133,475, 3 pages.
Notice of Requisition mailed Nov. 5, 2021 in Canadian Patent Application No. 3,093,001, 4 pages.

* cited by examiner

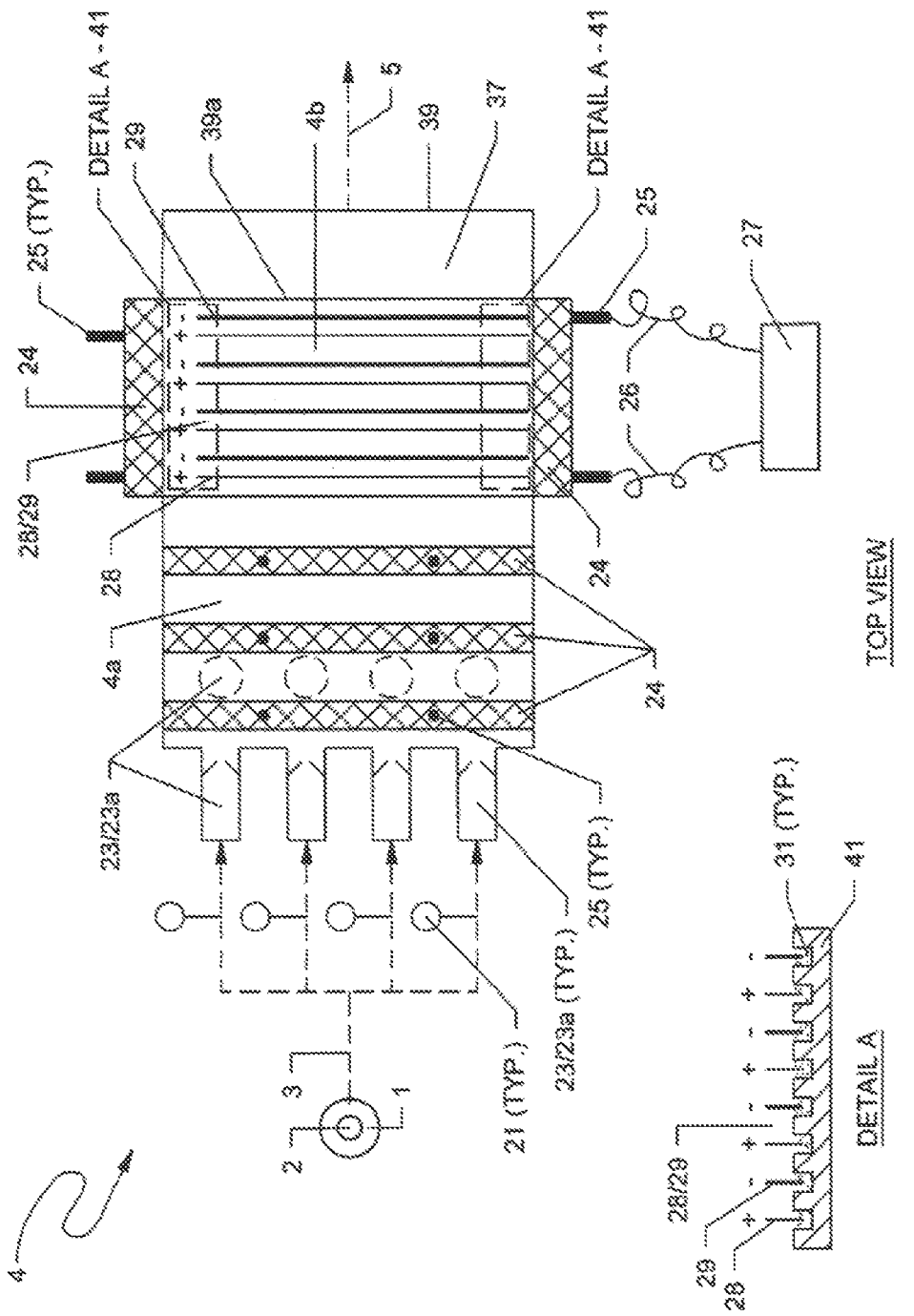

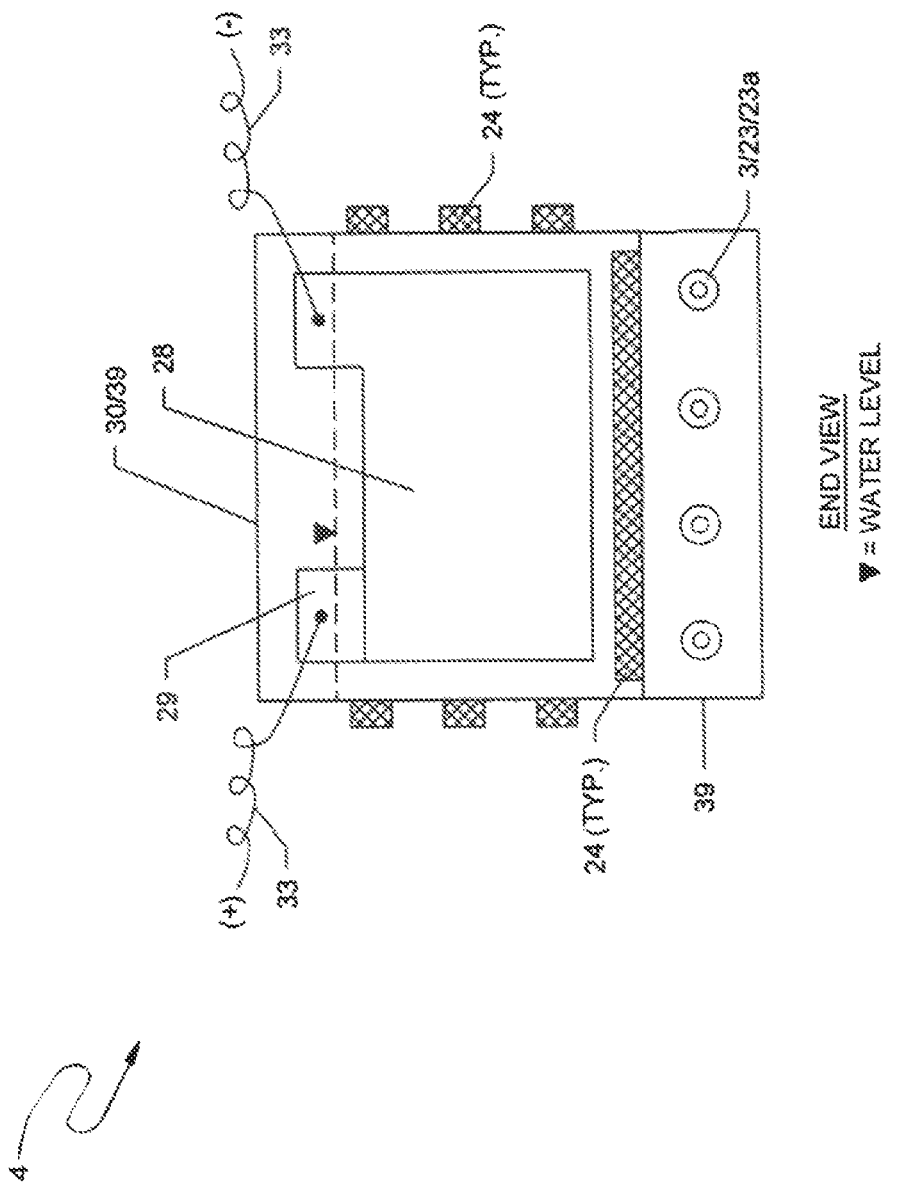

SYSTEMS TO TREAT PFAS AND OTHER PERSISTENT ORGANIC COMPOUNDS AND OXIDIZABLE MATTER IN AQUEOUS FLUIDS

CROSS-REFERENCE TO RELATED APPLICATION(S)

The present application claims priority under 35 U.S.C. § 119(e) to U.S. Provisional Patent Application No. 62/826,859, filed Mar. 29, 2019, which is incorporated herein by reference in its entirety.

The present application is related to U.S. patent application Ser. No. 16/355,582, titled SYSTEMS AND METHODS FOR TREATING ACIDITY, HEAVY METALS, AND SOLIDS IN ACID MINE DRAINAGE AND OTHER AQUEOUS FLUIDS, filed on Mar. 15, 2019, which is incorporated herein by reference in its entirety.

The present application is related to U.S. patent application Ser. No. 16/167,347, titled "REVOLVING CHAMBER OSCILLATION MIXING DEVICE AND ASSOCIATED METHODS," filed on Oct. 22, 2018, which is incorporated herein by reference in its entirety.

TECHNICAL FIELD

The present technology generally relates to devices, apparatus, and methods to treat Per- and polyfluoroalkyl substances (PFAS) including perfluorooctanoic acid (PFOA) and Perfluorooctanesulfonic (PFOS) and other telomeres; other recalcitrant chemicals and substances in water, aqueous fluids, condensates, concentrates and brines, and spent solid adsorbent media using two forms of cavitation, electrochemical oxidation, and supplemental reagent precursors.

The disclosed technology combines: hydrodynamic cavitation; acoustic sonication; electrochemical oxidation; and supplemental reagents to create powerful oxidizing conditions and oxidants that destroy oxidizable compounds, substances, and contaminants. The disclosed technology applies water pressure to derive hydrodynamic cavitation, acoustic energy to produce ultrasonic cavitation, and electric power to inert dimensionally stable electrodes with a wide electrochemical potential window range in aqueous fluids, containing supplemental precursor reagents and contaminants requiring treatment. Various elements and components of the technology described herein are assembled and applied in an integrated singular system or plurality of systems to generate powerful mixed oxidants that attack and destroy said substances within the system that also enhances destructive oxidation conditions.

BACKGROUND

Per- and polyfluoroalkyl substances (PFAS) including perfluorooctanoic acid (PFOA), Perfluorooctanesulfonic (PFOS), Gen-X compounds and related telomeres; other emerging contaminants that include organic compounds that comprise endocrine disruptors, and a variety of pharmaceuticals; and many more historic organic chemicals characterized by strong highly stable molecular bonding are problematic contaminants that create risk to human health and the environment. These types of substances bioaccumulate within humans and other living things when contaminated food and water is consumed. PFAS in particular, are often referred to as "forever chemicals" because they do not degrade naturally by design due to extremely strong carbon-fluoride chemical bonds. Because these substances are: widely incorporated throughout a multitude industries for products used and consumed by society; extremely stable; non-reactive; soluble in water; and prone to migration and uptake by living organisms where they biomagnify, such contaminant chemicals are ubiquitous throughout food chains, aquatic systems, manufacturing processes, and are inadequately addressed by conventional upfront treatment and downstream waste management systems. PFAS, and in particular PFOA and PFOS, are linked to various adverse health conditions such as: infant and youth growth inhibition; behavioral issues; interference with hormones; elevated levels of cholesterol; hypertension; thyroid diseases; immune system disorders, as well as testicular, kidney, liver and other cancers. PFAS and such recalcitrant organic compounds resistant to degradation and treatment are known to be toxic and thus are risks to human health and the environment. New means and methods to "break" the environmental and societal cycles of PFAS and other such contaminants that prevent their migration is essential. Contaminant destruction terminates the problem.

Currently, desired PFAS treatment objectives for commercial applications focus on the removal of PFAS from its current cycles through the environment and society in general. From a waste management perspective, PFAS exists in liquids and solids. For solids/soil, long-term fixation of PFAS in these materials will ideally prevent its leaching and migration to water. Such technology is well outside of the scope of the present disclosure, however, until such technology is developed and accepted, management of PFAS in solid matrices will remain problematic, particularly for landfills, as an example, where interned solid waste containing PFAS such as soil, biosolids, general refuse and the like has and will continue to release and leach PFAS into landfill leachate that must be subsequently managed.

For liquids, such as drinking and contaminated site groundwater, the most common PFAS treatment remedy is accomplished by technologies such as granular activated carbon adsorption, ion exchange resins, or membrane separation (e.g., reverse osmosis). PFAS impacted fluid disposal by deep well injection may be another option. Unfortunately, these treatment methods do not destroy PFAS, but rather, they transfer PFAS mass from one media (water) to another, i.e., a solid or a subsurface geologic formation. For water treatment media, contaminant removal capacity will be reached and the must be managed as a solid waste either by incineration or thermal regeneration, or if landfills are willing to accept the material, by internment. Incineration and thermal regeneration at high temperature is acceptable at this time as a means to destroy PFAS, however, there is concern high temperature by-product intermediaries of PFAS can migrate via air emissions from thermal processing facilities to downwind receptors. Further, thermal processing facilities generate ash or residual solid material fines that may retain PFAS that was not completely destroyed. Also, such processing facilities are not always geographically convenient to a PFAS source site, thus adding material transportation cost to those that are already elevated for energy, and processing, and then also those for disposal of the processed material if it is not returned to market as a regenerated service grade produced. When landfilled, PFAS-loaded solid media has the real potential of leaching from the media and enter the leachate of the landfill, where leachate treatment will be required to remove PFAS prior to discharge to a local POTW or other permitted effluent discharge. With this option, PFAS cannot be assuredly removed from the "PFAS cycle." While deep well injection may provide a disposal option in some locales where water tables are fully protected, these disposal facilities are also not always geographically proximate to the fluid source, and large volumes of low PFAS concentration cannot be cost effectively transported to the well unless conveyed by pipeline, and here again, PFAS is not destroyed. In these cases, carbon, ion exchange resins, or membrane separation are the common remedies being practiced, along with, for example reverse osmosis to yield high quality effluent yet a highly concentrated reject fluid that is extremely problematic to dispose.

In response to the elevated and foreseeable need for a method to destroy PFAS in waters and fluid researchers are evaluating many destruction approaches in the lab. There has been over the past few years and continues to be extensive laboratory studies being devised and performed that examine biodegradation, thermal processing (desorption and incineration, plasma, etc.), and oxidative approaches to identify and evaluate PFAS destruction. Most oxidative approaches rely on well-known processes such as metal/peroxide reactions (e.g., Fenton's), and various approaches that singularly utilize or combine electrochemical oxidation using innovative electrode materials, including Boron-doped diamond (BDD), ultrasound, ultraviolet light, microwave, chemical oxidants, catalysts, and others. All of these singular technologies have produced results that show promise to destroy PFAS compound. Those that have combined technologies have found enhanced results. However, whether applied singularly or in a combined approach, the achieved treatment results were inadequate to meet the current target of 70 ppt advisory level or struggled to meet the extremely low level 6-10 ppt limits regulatory agencies are now considering in an acceptable timely manner. Treatment times reported in the literature often requires up to 3 hours or more of processing time is required with aggressive applications of energy, and reagents even when in an operating in a reprocessing/recirculation loop to achieve low level contaminant concentrations in treated effluent. Further, many approaches that utilize reagents have encountered exhaustion of oxidation capacity due to high stoichiometric ratios of reagent to contaminant. Lab-scale studies are also not usually performed on real-world waters and fluids, but on laboratory grade water and analytical grade reagents at small scale that do not often incorporate other constituents found in wastewater or a water sourced from a contaminated site.

There is a need for an innovative destructive PFAS technology to address PFAS in water and fluids, and spent media at locations where PFAS cleanup and remediation is performed, as well at locations where PFAS is found in wastewater such as manufacturing and plating operations. Such a technology needs to: be flexible to address other contaminants hosted in waters to be treated; operate in a reliable and controllable manner; produce high quality effluent with low ng/L (ppt—part per trillion) concentrations of PFAS; handle steady or intermittent volumes at a productive flow rate. Further, the technology needs to be a low consumer of energy and chemical reagents. The present technology disclosed herein addresses these and other problematic issues identified in the research and with technologies currently available. It combines multiple oxidation technologies that include hydrodynamic, acoustic, electrochemical, static methods that not only destroy PFAS in aqueous fluids, but also other co-contaminates that can compete for oxidants and/or interfere with mineralization reactions using multiple means to maximize powerful oxidant production and oxidizing conditions with the ability to replenish oxidants that are exhausted during their intended purpose of oxidizing contaminants. Importantly, the combined methods each contribute to help reduce the energy required by the other, an in particular electric power, and reagent consumption. The technology utilizes adjustable water pressure from pumps to create hydrodynamic cavitation, that can reduce power needs for ultrasound acoustic energy, that in turn, reduces power demands from the electrochemical oxidation cell. These methods also engage substances and reactants in water such as sulfate and carbonate, or added to water such as hydrogen peroxide, that have less oxidative potential than what is needed to achieve adequate treatment levels of the contaminants and converts them to oxidants with potentials that approach that of fluorine gas to not only achieve water quality objectives, but on a continuous realistic flow rate.

BRIEF DESCRIPTION OF THE DRAWINGS

FIGS. 5A, 5B, and 5C illustrate various embodiments of a cavitation/electro-chemical oxidation reactor suitable for use with embodiments of the technology described herein.

FIGS. 6a-1 and 6a-2 illustrate a granular media treatment process suitable for use with various embodiments of the technology described herein, with FIG. 6a-1 showing a single absorber unit configured for in-service water treatment and FIG. 6A-2 depicting an example of the same absorber of 6A-1, but in an off-line operational mode where its media is being processed.

DETAILED DESCRIPTION

Figure 1:
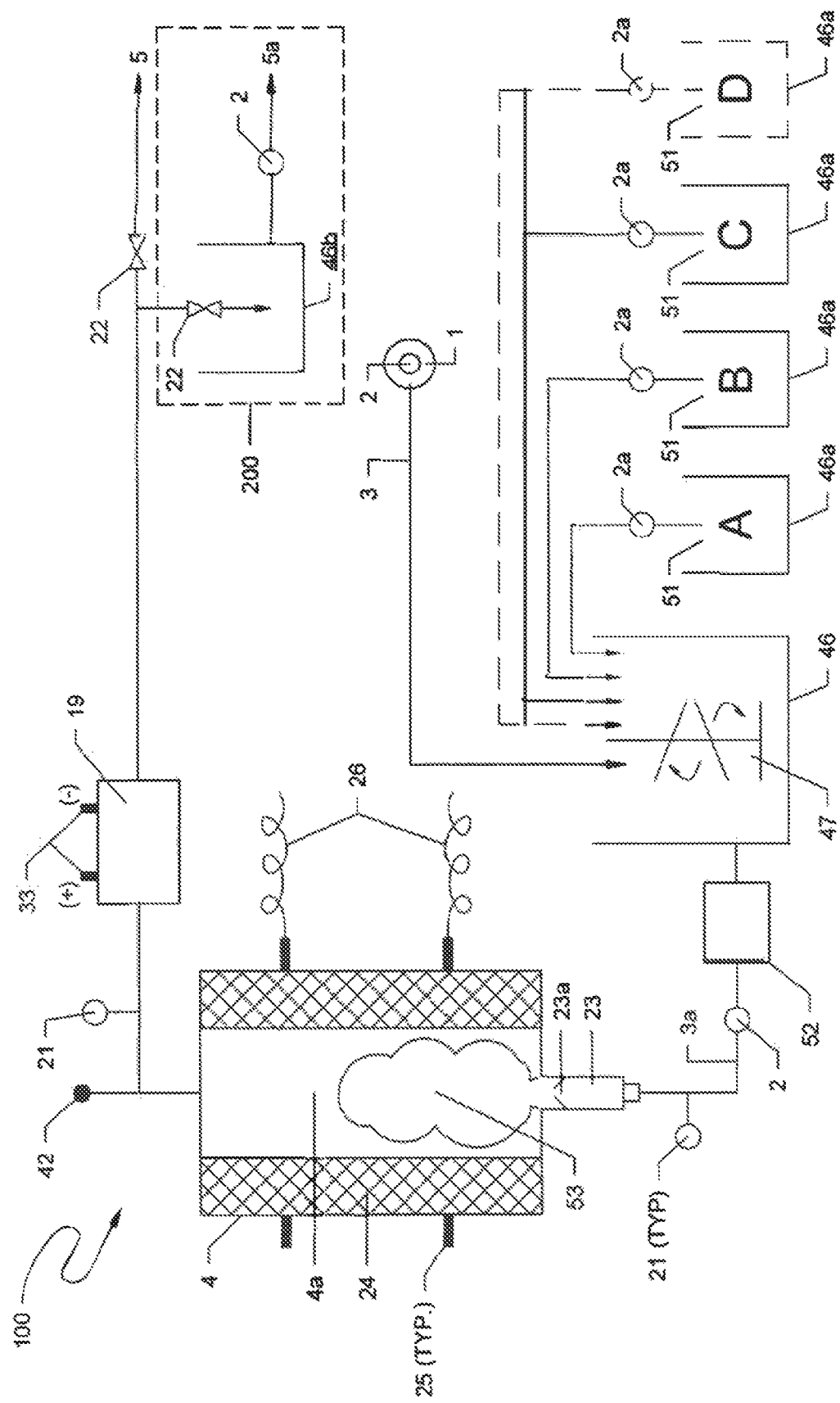
FIG. 1 is a schematic diagram illustrating a basic flow and component configuration in accordance with various embodiments of the technology described herein where supplemental reagents can be separately added to water to be treated in a mix tank.

The technology described herein generally relates to devices, apparatus, and methods to treat Per- and polyfluoroalkyl substances (PFAS) and related telomeres including perfluorooctanoic acid (PFOA) and Perfluorooctanesulfonic (PFOS), and other recalcitrant highly stable organic compounds, substances, organic matter, infectious pathogens, endocrine disruptors, pharmaceutical, and otherwise oxidizable material in water, aqueous fluids, condensates, concentrates, brines, and spent solid adsorbent media. The disclosed technology couples and combines: two forms of cavitation; electrochemical oxidation; enhanced low-energy static mixing; and supplemental reagents to create powerful oxidizing conditions and oxidants within and by the process components that destroy oxidizable compounds, substances, and contaminants. The equipment applies water pressure to derive hydrodynamic cavitation, acoustic energy to produce ultrasonic cavitation, and electric power to inert dimensionally stable electrodes with a wide electrochemical potential window range in aqueous fluids containing supplemental precursor reagents and hosted contaminants requiring treatment.

The elements and components of the disclosed technology are assembled and applied in an integrated singular system or plurality of components and systems that allow for continuous flow processing, or batch treatment operation with recirculation as may be desired based. Collectively the disclosed systems and components maximize efficient transfer of electrons through a variety of devices and reactants to generate these oxidizing conditions and powerful oxidizing agents qualified as some of the most elevated oxidizing potentials known next to Fluorine gas. Some mixed oxidants that are produced by the technology described herein, such as percarbonates and persulfates, have latent stability that propagate ongoing subsequent oxidation reactions after processed fluid is discharged from the disclosed equipment and treatment components. This latency is importantly beneficial for treatment of broad contaminant diversity, and the range of concentrations and stabilities typically found within most sources of water that commonly host a mixture of contaminants requiring treatment. Another feature of the technology described herein is its ability to generate latent oxidants, but also oxidants with pro-longed effective reactivity. Yet another benefit of the technology described herein is that it provides significant flexibility to control the types and concentrations of the oxidant types and their ratios to best align with the specific contaminants and substances present. This allows for customized process design and subsequent operations to meet a range of needs related to untreated water and contaminant characteristics and water treatment objectives determined by regulatory or re-use water quality compliance limitations The technology described herein can be applied in-line/in-stream on impacted water, aqueous fluids, wastewater, condensates, concentrates and brines, as well as to the treatment of contaminants adsorbed to solid media such as granular or powder activated bituminous, lignite, coconut and other such carbons as well as other media types. The disclosed technology is directly applicable to: condensates containing organic compounds derived from the regeneration of spent activated carbons; reverse osmosis and other separation/extraction technology reject or recovered concentrate fluids; and those resultant from the regeneration of ion exchange resins and other such media. Further, the processing of pure or treated water with appropriate reagent precursors using the technology described herein produces a variety of oxidizing fluids and solutions with viable long-term latency and retained oxidation potential for use in manufacturing, chemical treatment processes, disinfection applications and in situ remediation of soil and water tables that are not all exclusive to ex situ water treatment within the equipment and apparatus disclosed.

The present technology is suitable for scale up to large flow operations, however, small scale systems that are simple to operate, portable and easily maneuvered are well suited for onsite/on-demand production of oxidizing fluids and disinfection solutions for direct application. Other small systems are well suited for use in laboratory and testing facility settings, and miscellaneous other applications, and where small to mid-size systems might appropriately address water pre-treatment and/or post-production needs for manufacturing purposes as well as for wastewaters sourced from various manufacturing systems, facilities, and operations. Large systems are also viable, however other disclosed embodiments provide for an ideal application to treatment media that capture and remove contaminants from high flow rates with lower concentrations of contaminants. Granular activated carbon, as an example of one such sportive media, is well proven, highly accepted and widely used to treat contaminated drinking and groundwater among other applications.

As stated elsewhere in the specification, the technology described herein is well suited to treat such media that contains such contaminants, even when contaminants are highly concentrated within the spent media. The use of media such as activated carbon, ion exchange resins or other extraction/transfer technologies coupled with onsite treatment, regeneration and destruction of PFAS and other organic substances is one application of the embodied technology. With destruction of problematic substances in solid media, the present technology can break the migration cycle of PFAS and other such contaminants that are known to migrate through the ecosystem, and as such, mitigate environmental liability and risk to human health and the environment.

The disclosed technology provides a primary function of destroying organic compounds and substances that are extremely stable, recalcitrant, persistent, highly soluble, mobile in the environment, and not readily degraded by natural means using methods and means disclosed herein. With the ability to treat and destroy these highly problematic substances, more labile contaminants are readily treated, particularly when they may be hosted in water and fluids that also contains more stable forms.

Four (4) primary components of the present technology that work in concert to destroy organic compounds and other said matter in solution include: 1) hydrodynamic cavitation; 2) acoustic cavitation; 3) electrochemical oxidation; and 4) low-energy passive mixing—all coupled and integrated with supplemental reagents to facilitate the formation of oxidants, and oxidizing conditions within the system to remove electrons from target contaminants to achieve contaminant destruction. Other embodied components and functions that may be provided to further facilitate the reactions provided by the present technology may include: filtration/solids separation; magnetic molecular alignment; UV irradiation; and provisions to facilitate or engage catalyst material and/or nanoparticle participation in process reactions.

Desired degradation products produced by the disclosed treatment technology typically include: carbon dioxide; dissolved halide salts when halogenated organic compounds and substances; and residual mixed oxidant species when organic substances and compounds are in water or fluids to be treated. Considering other aspects, the present technology avoids the generation of separable solids prior to the destruction of, for example, PFAS. Formation and/or separation of solids from water prior to PFAS destruction will yield solids that will likely contain PFAS. This creates problematic secondary waste handling, processing, and management and disposal issues, and in particular, PFAS is not destroyed. One purpose of the present technology can be to destroy PFAS and such substances so that their future potential to migrate from partially treated by-products and waste streams into the ecosystem is terminated. Destruction of PFAS and other recalcitrant substances in water and fluids, and for example, plating wash and rinse waters, prior to the removal of dissolved heavy metals, solid fines, and other such matter separable from source water using conventional treatment technology is an embodiment and beneficial application of this technology As stated earlier in this disclosure, one function of the treatment technology described herein can be to facilitate the transfer of electrons effectively and efficiently to destroy contaminants in water. Another function of the technology described herein can be to engage electron transfer in the production of substances that can be further activated within the process reactions to form strong oxidants, for example sulfates and carbonates. The overarching purpose of such transfers is to initiate, facilitate, and prolong oxidation/reduction reactions with the atoms, ions, and molecules that makeup contaminants, supplemental reactants, and reactants created by and within the equipment and components of the process system. These oxidation/reduction reactions are defined by transfer, that is, the loss or gain, of electrons from or to a substance in a chemical reaction. Reactions facilitated by the present technology are both oxidative and reductive. A substance is oxidized if it undergoes a loss of electrons, and the oxidation state of the substance is increased. If the oxidation state of a substance is decreased, that substance is reduced. For example, oxidation of zero valent iron (ZVI) expressed chemically as $Fe^0$ becomes $Fe^{+2}$ with the loss of two electrons, and with the loss of yet another electron, $Fe^{+2}$ becomes $Fe^{+3}$. Conversely, $Fe^{+3}$ is reduced when if gains an electron and become $Fe^{+2}$. Redox reactions occur in pairs, so a ½ reaction consists of the oxidation or loss of electrons, and the other ½ reaction consists of the reduction side or gain of electrons in the reaction system. The direction of an oxidation/reduction reaction of a substance is driven by the strength or tendency of substance to lose or accept electrons, and that a measure of that tendency is the Reduction/Oxidation (Redox) potential for that particular substance, or simply, the oxidation potential is the ease at which an electron can be donated or acquired. Redox potential is measured in volts (V) and each substance has its own defining redox potential as referenced to a standard hydrogen electrode (SHE) that has an assigned accepted potential of 0.00 V. The more positive oxidation potential of a substance based on the SHE measurement, the more powerful that substance is as an oxidant, i.e. the more readily it will release electrons and increase its oxidation state. The lower the oxidation potential, the more readily the substance will accept electrons and decrease its oxidation state.

The disclosed technology facilitates the generation of oxidants with extremely elevated levels of oxidation potential. Based upon the extreme stability of PFAS and similar substances, the higher the oxidation potential of oxidant needed to destroy said substances. Table 1, below, provides list of common oxidants and their published oxidation potential in volts (V), with Fluorine gas being the most powerful.

TABLE 1

Oxidation Potential for Common Oxidants

| Oxidant | Oxidation Potential (V) |
|---|---|
| Fluorine ($F_2$) | 3.0 |
| Hydroxyl radical - acidic pH (•OH) | 2.8 |
| Sulfate radical (•$SO_4^-$) | 2.6 |
| Singlet (atomic) Oxygen (•O) | 2.4 |
| Ozone ($O_3$) | 2.1 |
| Persulfate ($S_2O_5^-$) | 2.1 |
| Hydroxyl radical - neutral pH (•OH) | 1.8 |
| Peroxymonosulfate ($HSO_5^-$) | 1.8 |
| Hydrogen Peroxide ($H_2O_2$) | 1.8 |
| Carbonate radical (•$CO_3^-$) | 1.8 |
| Perhydroxyl radical ($HO_2$•) | 1.7 |
| Percarbonate (as Sodium percarbonate) | 1.6 |
| Chlorine dioxide ($ClO_2$) | 1.5 |
| Chlorine ($Cl_2$) | 1.4 |
| Oxygen ($O_2$) | 1.2 |
| Hypochlorous Acid (HOCl) | 0.95 |

With respect to the present technology, typical contaminates found in water to be treated and types and range of supplement reagents that can be added, and Table 1, oxidants utilized, generated, produced, and/or otherwise active in process reactions even if short-lived include: oxygen, percarbonate as sodium percarbonate; Peroxymonosulfate, hydrogen peroxide, ozone, singlet oxygen, and importantly, sulfate, hydroxyl, and carbonate radicals, While not desired for PFAS treatment due to the low oxidation potentials and the possibility of halogenating organic compounds during the process or potentially inhibiting desired reaction through interferences and/or equilibrium issues, hypochlorous and hypobromous (not listed) acids are important for disinfection purposes.

These oxidants in water react with organic compounds also carried in the water. When the oxidants carried by water come in contact with organic compounds adsorbed in a media, e.g., activate carbon, the organic compounds, such as PFAS are also destroyed. While hydroxyl radicals are extremely reactive and powerful, they are short-lived. The sulfate/persulfate radical process has greater latency. Ozone as a gas, is also very powerful, but upon their formation to a gas, the surface tension of the bubbles minimizes active interaction between dissolved PFAS and organic compounds and the gaseous ozone oxidant within the bubble. Reduction of ozone bubble size to enhance the surface area of a bubble will increase the amount of ozone interaction for the same mass of ozone generated, i.e., more reactive surface area for same mass of ozone. Keeping fluids under pressure when ozone is generated will increase levels of dissolved ozone vs. gaseous ozone, thus enhance availability for participation in oxidation reactions.

The present technology also utilizes reduction processes to facilitate treatment. Many researchers have investigated the oxidation of chlorinated organic compounds. As an example, one identified organic species that can potentially be generated from chlorinated compound oxidation is chlorate, a terminal oxidation end-product. When present, chlorate requires reduction to further its treatment. On embodiment of the present technology, as discussed elsewhere, is the use of a media reactor (passive or active) that is charged with zero-valent iron. Chlorate with the reactions between Fe0, $Fe^{+2}$, and $Fe^{+3}$ here electron transfer again will facilitate effective treatment within the present technology.

Process Treatments
Cavitation

To better describe the importance of cavitation to the present technology, a brief discussion of the phenomenon is merited. In general, cavitation is the result of alternating high and low pressures induced to a fluid in rapid sequence that propagate compression waves within and through a fluid. Further, cavitation can be classified as either "inertial" or "non-inertial" (or transient and stable) where a simple delineation between the two for purposes of the disclosed technology is where "inertial" cavitation is when a void or bubble collapses violently and quickly in a liquid, and "non-inertial" cavitation occurs when a cavitation bubble oscillates in size or shape due to influences in the fluid. The present technology uses fluid-dynamic and ultrasonic acoustic energy to create both two types of cavitation that are essential to the performance of the present technology.

Purposeful fluid-dynamic methods facilitate inertial cavitation that create pressure changes in cavitation chamber causing expansion and contraction of water or the fluid resulting in voids or cavities (or bubbles) that form, grow and collapse where bubbles are filled with vapor sourced from the fluid itself. Violent inertial cavitation bubble collapse generates bubble content and surface temperatures that can surpass 4500° C. with pressures of roughly 1000 atm that are extreme physical and chemical conditions for aqueous liquids that form hydroxyl and then peroxide radicals from water itself. Equally importantly, when water is displaced, the created pressure gradients in the water provide intense micro mixing, thus intimate contact of constituents in and with water. When water contains contaminants requiring treatment, and if supplement reagents are added, not only are hydroxyl and peroxide radicals formed, so too are other oxidants such as persulfates and percarbonates, that are then activated by cavitation to their powerful sulfate and carbonate radical forms. These oxidants formed from the water and the water's constituents then begin to attack oxidizable species.

The present technology applies purposely aligned nozzles or cavitation jets that are feed with the source or feed water at a high enough pressure through a small diameter orifice which empties into a larger chamber to cause a differential water velocity and pressure to overcome the vapor pressure of the fluid and its contents necessary to initiate cavitation. These rapid changes cause the formation of fluid pressure gradients that initiate cavitation bubble formation that are similar in both size and longevity. With an adequate feed pressure and differential, cavitation bubbles will also form a bubble swarm that will propagate throughout and past the cavitation reaction chamber in which the cavitation nozzle empties.

Although an essential and important component of the current technology because of the formation of oxidants and the intense mixing, hydrodynamic cavitation caused by nozzles is limited in its ability to generate controlled pressure gradient intensity and frequency, being restricted by the design of the hardware components (pressure, velocity, internal volumes. Therefore, treatment efficacy by this component of the technology is largely limited to the treatment of broad-spectrum labile contaminants. Further, hydrodynamic cavitation will initiate the destruction of stable contaminant by attacking their functional groups or weak bonds within longer molecular chains. As another benefit, inertial cavitation bubble swarms can be directed to collide with each other from opposing nozzles to increase energy within the chamber, but also aimed at target plates to cause cavitation erosion and corrosion of target material as included in this disclosed technology to release particles, nanoparticles and ions to the water that contribute and/or participate in contaminant destruction reactions. Lastly, the beneficial generation of the short-lived hydroxyl radical and more latent oxidant precursors that are excited and also present in the reactor chamber and in condition for the second from of cavitation of the present technology that is imposed to water and fluid within the same reaction chamber.

Ultrasonic energy caused acoustic cavitation creates oscillating bubbles that fall under the definition of non-inertial cavitation for purposes of this disclosure. Non-inertial cavitation does not necessarily cause explosive bubble collapse, but is does cause a bubble of gas is forced to oscillate in a fluid under the presence of an acoustic field. The bubble oscillates because the gas molecules inside oscillate in the acoustic field, pushing the liquid away during rarefaction before letting it rush back in during compression. As a result, the bubble gets larger before suddenly becoming smaller without necessarily collapsing. This oscillation causes mixing, but also continued reactions within the bubble and on surfaces that also create intense heat and pressure, that cause reactions with water and its constituents to form hydroxyl radicals and oxidants that treat contaminants.

Ultrasonic cavitation is also controllable with respect to energy watts, acoustic intensity, and frequency modulation. While transducer frequency is controlled during the design of the disclosed technology, multiple transducers can be provided of different frequencies and the power supply units can modulate the frequency to those transducers to fluctuate above and below the design. Further, power to the transducer can also be easily adjusted during operation. This allows for tuning of the ultrasonic components with other system components to accommodate a variety of contaminants and their concentrations in source water.

Unlike hydrodynamic cavitation that propagates throughout the reaction chamber, acoustic energy derived cavitation distorts and dissipates incrementally with distance from the transducer radiating surfaces. As a means to overcome this limitation, the present technology uses a "cross-fire" alignment between hydrodynamic nozzles and sono-transducers (rods, horns, or rectangularly aligned piezoelectric cells) positioning. The intense mixing from the nozzles also causes turbulent well mixed flow that facilitates fluid and constituent movement into the acoustic field. Ultrasonic power application and frequency modulation also prevents synchronous cavitation pressure gradients caused by unchanging inertial cavitation bubble and bubble swarm patterns while maintaining overall cavitation activity within the chamber with an adjustable dominant frequency that can be optimized to specific application of the technology to water and its constituents. Further, adjustments can be made during operations to accommodate varying characteristics of source water, but that can also integrate with power adjustments to the electrochemical oxidation cell also related to the use of varied supplemental reagents. The combination of cavitation types cause multiple harmonic frequencies that are conducive the generation of the variety of mixed oxidants necessary to oxidize stable and less stable organic matter in the source water being processed. It is suspected that these cavitation pattern differences may also have direct consequences in the excitement of various chemical molecules and their variety of bond energies. Lastly, ultrasonic acoustic cavitation can provide both non-inertial and inertial types of cavitation. This is a benefit to the present technology when the hydrodynamic nozzle's inertial cavitation patterns can be complimented with another frequency concomitantly with the added benefit of frequency modulation to efficiently produce effective oxidizing conditions and activate oxidants that will attack target contaminants, but also to prepare the water and constituents for electrochemical oxidation.

Electrochemical Oxidation

The technology described herein includes the use of one or more electrochemical oxidation (ECO) electrolytic cells. These units can be configured with dimensionally stable electrodes such as graphite, stainless steel, tungsten, and/or boron-doped diamond (BDD) materials. Depending upon the polarity, voltage, and amperage in which DC is applied, these cells will water and its constituents to create oxidants through electron transfer as well as facilitate direct destruction of recalcitrant organic species, such as PFAS, by direct electron transfer at BDD electrode surface via anode oxidation. Standard volt potentials of various chemicals and contaminants processed by the technology dictate that an over/under potential for a given application that can be optimized during treatability studies required for the often-competing broad-spectrum of constituents in water being treated. However, and in particular, boron-doped diamond (BDD) is the preferred electrode material embodied in the present invention. A nanocrystalline thin diamond film with boron doping for conductivity is deposited on a robust mechanically stable conductive base material such as niobium. This produces an electrode that is dimensionally stable, chemically inert, highly and conductive with a reactive surface with the greatest known overpotential range for electrochemical applications. and are therefore the critically preferred material of construction for electrodes used with ECO's disclosed within the present invention.

This component and its wider overpotential range feature can be important to the disclosed system as that highly efficient electron transfer can occur with very limited generation of oxygen, and hydrogen (and heat) during water hydrolysis to alternatively generate hydroxyl radicals, hydrogen peroxide, ozone, single oxygen and others depending upon the constituents in and/or supplemented to the water and fluid being treated. Further, its ability to effectively utilize a high current density allows for the production of more oxidants from water and the water's constituents as well utilize those produced by cavitation, and the supplemental reagents at lower power rates, and where the evolution of unwanted hydrogen and oxygen can be minimized when higher power is required. While BDD electrodes alone can and destroy target contaminants, such as PFAS, by direct anodic oxidation, the BDD electrochemical cell and treatment reactions to destroy such contaminants can still be prolonged, requiring repeated treatment to assure electrode surface-to-contaminant contact, and unacceptable amounts of electric power. When combined with the other embodiments of the present technology described herein, additional oxidants created or supplemented from outside of the cell that require activation can be at the cathode and/or engaged in the highly oxidative conditions created within the electrochemical cell to achieve desired performance objectives. As another benefit, contaminant compounds and substances and/or those that are partially treated by cavitation, often requiring step-wise demineralization to fluoride and carbon dioxide can be attacked by the oxidants and oxidizing conditions created in the cell. Still yet another benefit of the cavitation and electrochemical oxidation cell treatment of target contaminants is that the combined processing will address both $1^{st}$ and $2^{nd}$ order rate constants of complex stable organic compounds and substances as well as their intermediaries with a variety of functional groups. Lastly and while only contemplated, the regeneration of sulfate ions to persulfate, and carbonate to percarbonate at the BDD anode after their respective radicals are exhausted concomitantly with activation at the cathode may provide still another benefit of the present technology as oxidants and their remnants from cavitation treatment reach the BDD electrochemical cell.

Low-Energy Passive Mixing

A mixing component is used with the present technology that: is enclosed from the atmosphere and capable of separating process derived gases, such as carbon dioxide, hydrogen, and/or oxygen; provides for intimate contact with water and its constituents to facilitate process reactions; requires little to no energy such as needed for mixers or feed pumps; and that can be piped directly to an upstream or downstream component of the present technology. Further, the mixer should also be able to have other options that can be installed within so that process reactions can be monitored for overall system control, but also to enhance and provide additional oxidation conditions for process performance by serving as a reactor.

An in-line sinusoidal reaction mixer is embodied within the present technology as described in greater detail elsewhere in this disclosure. In general, the unit is a pipe bent with equal or differing radii with pipe runs that can also have expanding and contracting inside diameter reaches. This is essential as oxygen from the atmosphere can be detrimental and compromise the desired reaction of the technology and impact the generation and performance of the oxidants created in the process at various locations in the technology where mixing is essential As a flow-through component, it can be fed by an upstream pump without the need for one being dedicated to this component. This minimizes energy requirements as further supported by the elimination of in-line paddles, blades and other obstructions and impediments to flow that unnecessarily increase pump pressure requirements The mixer is designed to accommodate other treatment process components such as catalyst screen chambers, magnetic fields, and UV lamps, among others, and couple with other embodiments of the technology. The mixing reactor will allow for latent oxidation in process reactions at critical junctures of disclosed systems. Its design allows for flexible insertion at various locations in a system of the technology as illustrated in the Figures.

Supplemental Reagents

The present technology has a benefit of generating oxidants and conditions necessary to treat contaminants if precursor constituents are present in the water or fluid being treated. As indicated in Table 1, oxidants with the highest oxidation potential have the ability to contribute greatest amount of electron transfer necessary to break chemical bonds of recalcitrant substance molecules, namely the carbon-fluoride (C—F) bonds that make PFAS so stable and non-reactive. While powerful oxidants are not the only means the present technology provides electrons to the destructive process reactions, these oxidants are critical and essential. As previously discussed, the effects of the inertial and non-inertial cavitation bubbles are critical, but cavitation alone cannot adequately produce desired treatment performance efficacy. Similarly, the electrochemical oxidation cell performs multiple critical functions, with one being oxidation of PFAS molecules directly on the surface of the cathode with direct electron transfer. Other reactions caused by the cell are also critical, including the generation of hydroxyl radicals, hydrogen peroxide, singlet oxygen, and other mixed oxidants using the constituents in fluid being treated where such constituents were in source water or if they were put into a reactive state with cavitation where electrochemical reactions can further benefit and propagate the oxidation process. However, when constituents in the fluid being treated do not have adequate concentrations of constituents to be converted to the most powerful of oxidants, or the ratio of production rate to contaminant concentration levels do not align with stoichiometric requirements and contaminant and fluid residence and contact time within technology components are inadequate, supplemental reagents are required to boost the production of the most powerful oxidants and thus encourage robust and aggressive electron transfer required to attack stable molecular bonds including C—F as provided by the technology.

Several types of reagents can facilitate the production of these essential and powerful oxidants that the equipment of the technology cannot produce in adequate quantity or quality given the need for elevated flow rates and extremely low concentrations of contaminants in treated water. Examples of preferred supplemental reagents are those that contribute to the production and generation of hydroxyl, sulfate, and carbonate radicals that are the most powerful oxidants. While the process equipment can generate hydroxyl radicals and hydrogen peroxide directly from water, the addition of hydrogen peroxide will allow for enhanced hydroxyl radical production. Another example of precursor limitation within source water would be sulfate and carbonate concentrations. The technology utilizes hydroxyl radicals in the production of persulfate and percarbonate precursor species to their respective radical forms. While hydroxyl radicals can be more powerful, they are non-selective and thus have a broad-spectrum and are rapidly consumed, whereas sulfate and carbonate radicals have lower oxidation potentials, and/or they are more selective and thus have a latency of oxidative potential to destroy contaminants that start to degrade but have not fully destroyed by carbon chain cleavage and molecular functional groups.

To enhance the reactions of the present technology, preferred supplemental reagents include: hydrogen peroxide, and sodium compounds of sulfate and carbonate. Application of commercially available Peroxymonosulfate and/or the use of sodium persulfate and/or sodium percarbonate are very beneficial and should be provided if cost effective, but if not, sodium sulfate and sodium carbonate are preferable. These later reagents, in addition to being oxidant precursors when in the conditions of the disclosed technology, also provide the added benefit of increasing fluid conductivity which directly relates to a reduction in water resistance within the electrode gap between the cathode and anode of the electrochemical oxidation cell, thus reducing electric power demand. As oxidant precursors, the technology will generate sulfate and carbonate radicals in the water and when activated by process conditions, for example, hydrodynamic and acoustic cavitation and within the electrode gap, convert to their more powerful oxidant radical forms.

Another preferred supplemental reagent is sulfuric acid that lowers pH to acidic levels where oxidation reactions are most productive and efficient. It also provides sulfate ions for contribution to the persulfate-sulfate radical reactions and protons that also have been reported as a favorable influence and participant in said reactions. When fluid pH is in the alkaline condition where oxidation reactions can be adversely affected, the use of liquid carbon dioxide will not only lower pH, it will also generate supplemental carbonate as part of the hydroxide neutralization reaction.

Ozone is another supplemental reagent that can be provided with the present technology using an ozone generator in a manner that minimizes gas bubble diameter. To be most effective, ozone must also be applied in the presence of ultraviolet light for the generation of hydroxyl radicals that oxidize contaminants and where UV light will activate persulfate and/or percarbonate to their most powerful oxidant radical forms.

Sodium chloride is also an effective supplemental reagent in certain technology applications, for example the production of hypochlorous acid for use as a disinfection solution and other weak oxidizing fluid where the chloride will not potentially contribute to undesired production of chlorinated organic compounds, such as chlorate, or interfere or compete with the production of oxidants with much higher oxidation potentials, but where pathogen treatment with the destruction of bacteria and/or inactivation of viruses is desired and where oxidant latency is favorable.

Other available and cost-effective supplemental reagents are suitable for use when they can contribute to efficient and effective production of the powerful oxidants by the present technology needed to treat PFAS and other persistent, stable, and recalcitrant compounds characterized with strong molecular bonding. Notably supplemental reagents that contain calcium, barium and other alkaline earth metals should be avoided as these can lead to problematic fouling and scaling within and on technology component surfaces when sulfate and/or carbonate are present as the fouling precipitation reactions with these metals in their dissolved state will preferentially react with sulfate and/or carbonate, thus also removing them from the necessary oxidation reactions.

General System

Figure 1A:
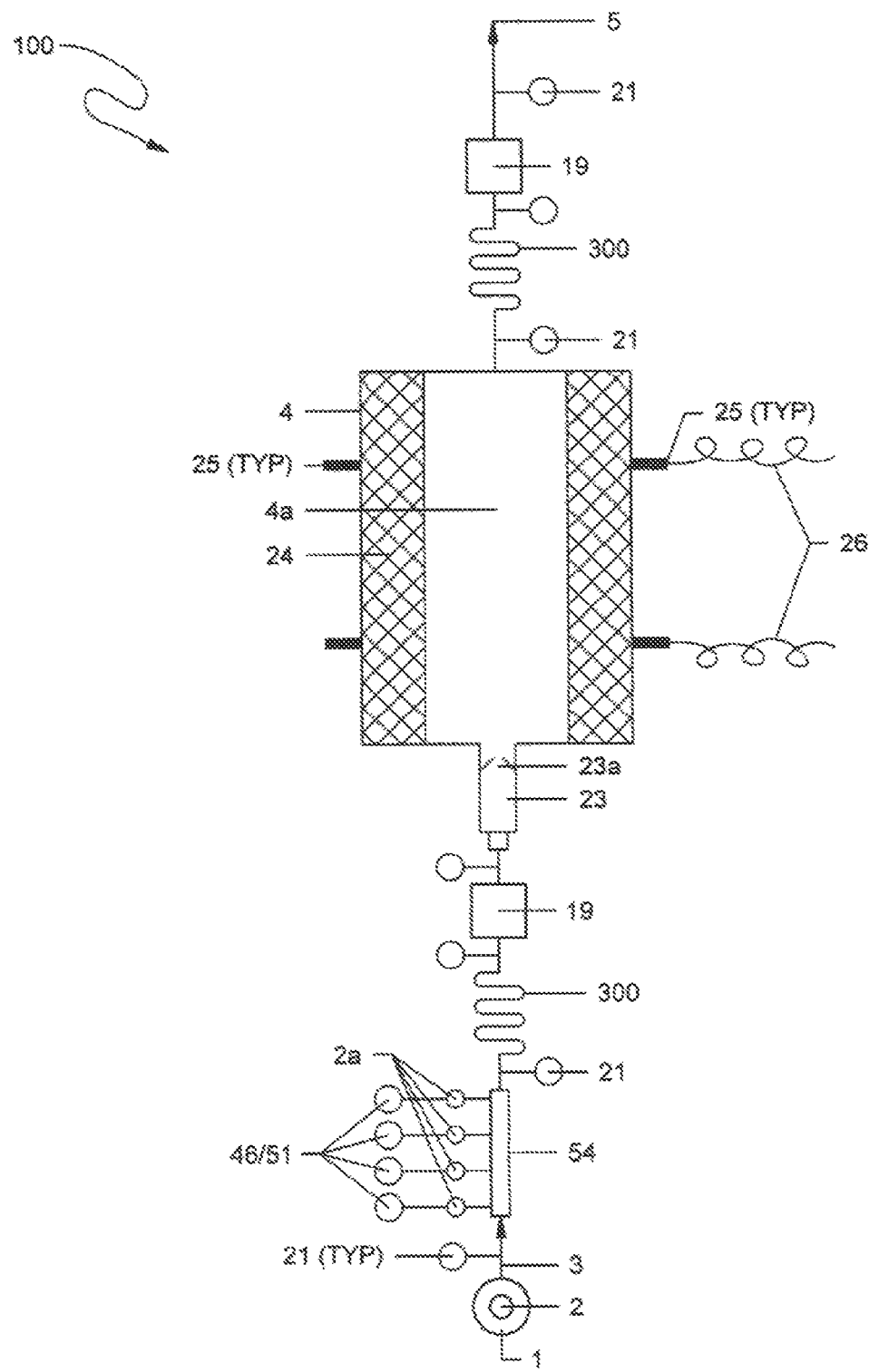
FIGS. 1A, 1B, and 1C illustrate in-line embodiments of the technology described herein where supplemental reagents may be separately added to water to be treated in-line via a piping manifold.
Figure 1B:
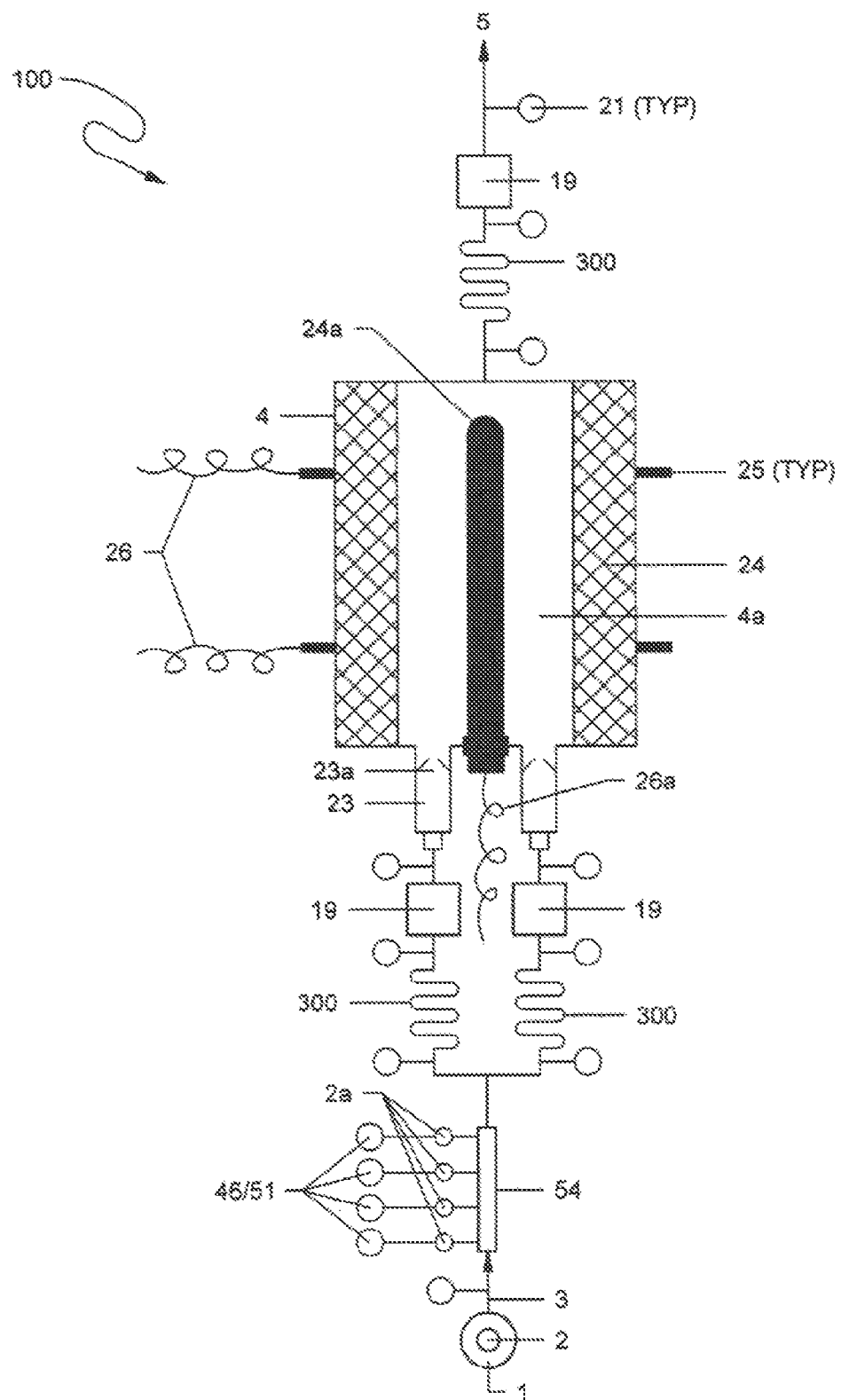
Figure 1C:
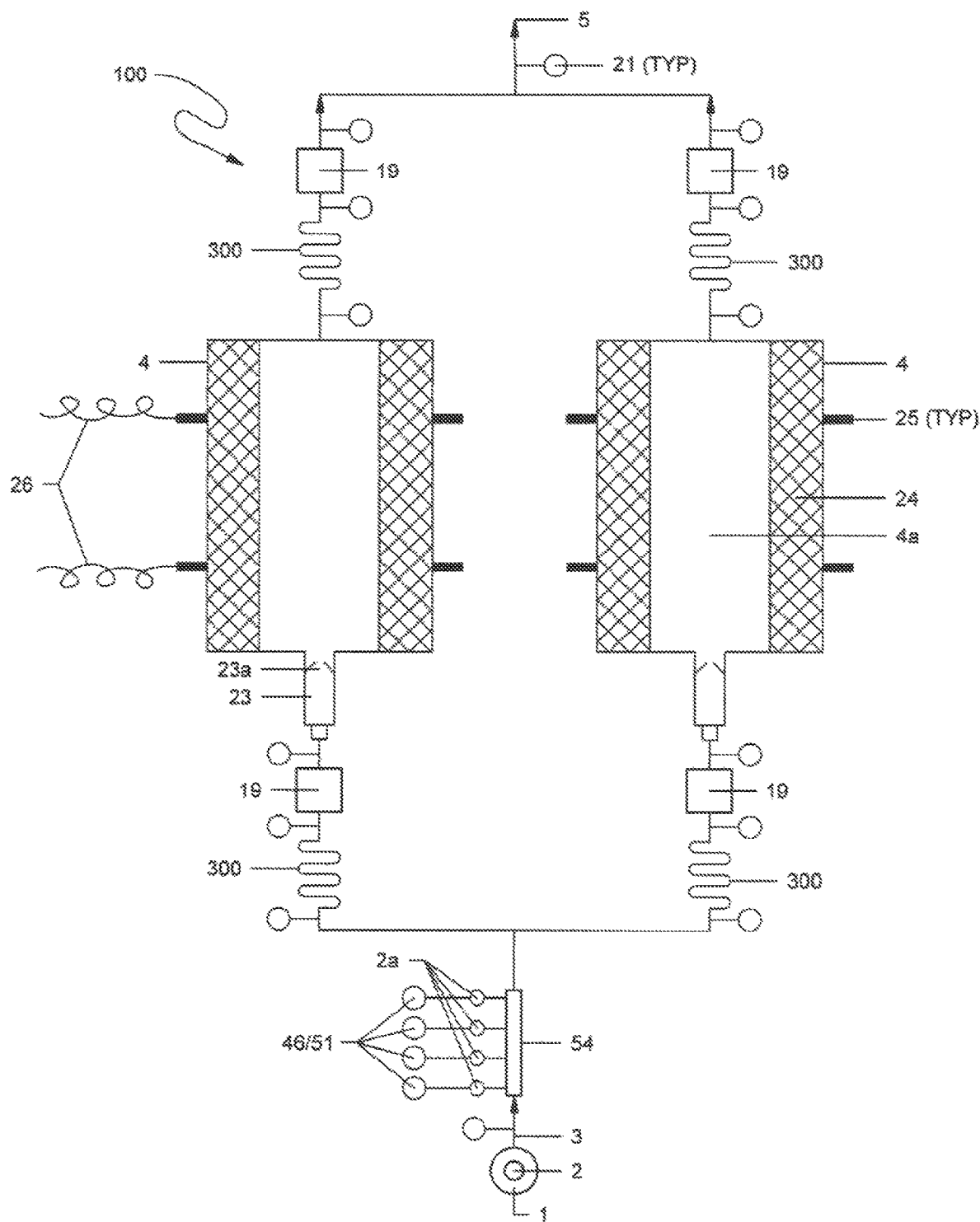

FIG. 1 is a schematic diagram illustrating a basic flow and component configuration of the technology as described herein where supplemental reagents are separately added to a mix tank. FIGS. 1A, 1B, and 1C illustrate an in-line embodiment of the present invention where reagents are separated added to a mix tank. FIGS. 1B and 1C illustrate additional embodied examples of the technology described herein showing some components in singularity and plurality configuration options, and where supplemental reagents can be added in-line through a manifold. FIG. 1 also depicts a configuration option where an oxidizing fluid or disinfection solution is produced and can be stored for later use.

Figure 2:
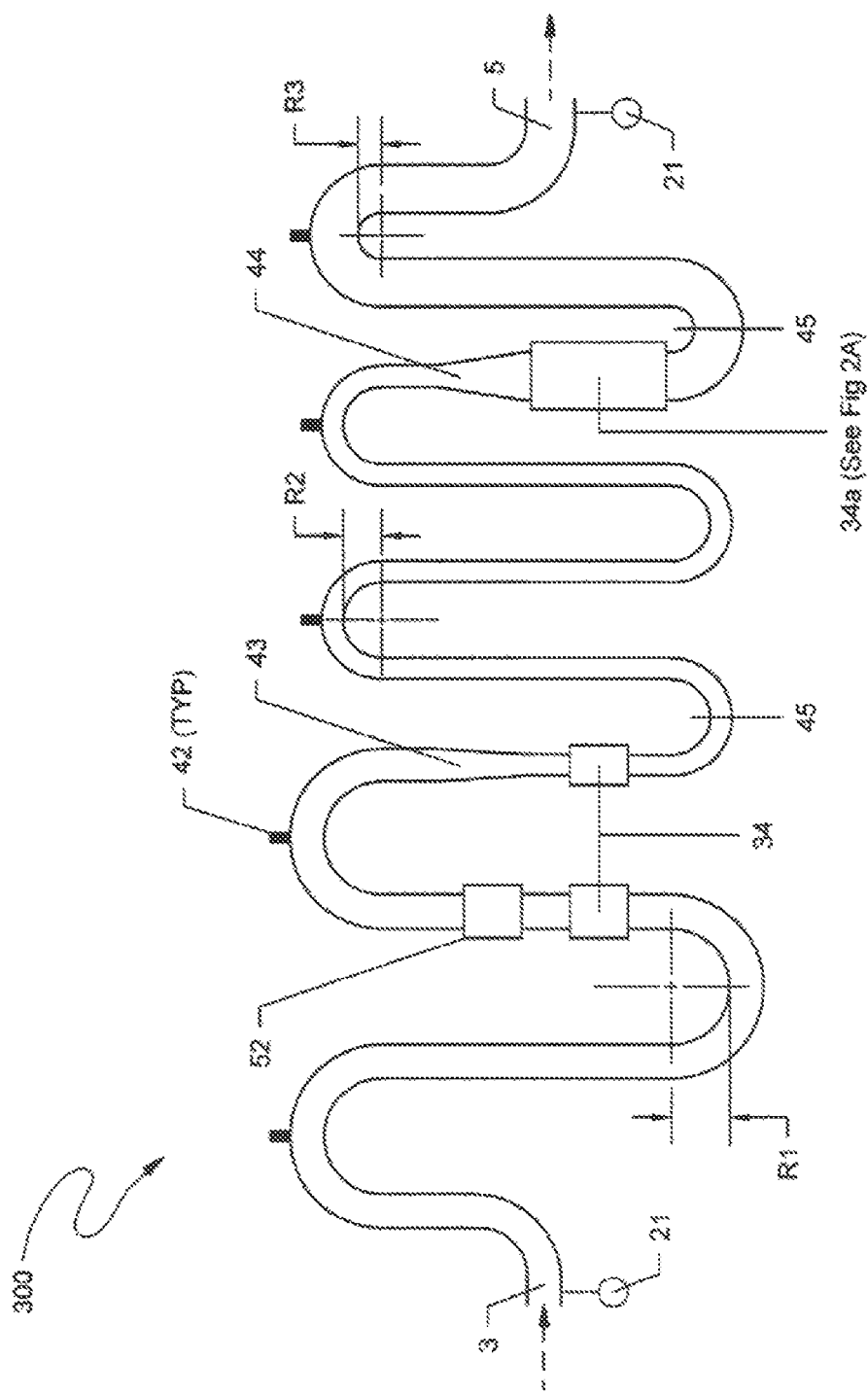
FIG. 2 is a schematic diagram illustration of an in-line sinusoidal mixing reactor according to various embodiments of the technology described herein, along with various optional component embodiments that may also form a part of the disclosed technology.

FIG. 1 depicts a generalized basic version of a system 100 for in-line water treatment with some optional components shown. An off-line version 200 of the system 100 allows for the production of an oxidizing fluid or disinfection solution when using treated water or a clean water source and an optional collection tank to store the produced water. Water or aqueous fluid 1 to be treated is transferred by pump 2 via conduit 3 into a mix tank 46 where a single reagent 51 is, or multiple reagents 51 (A, B, C, D. etc.) are, fed by (a) respective chemical feed pump(s) 2a into the mix tank 46 where the reagents 51 and feed water 1 are blended using a rotating spindle or paddle mixer 47, or by other means that are also embodied in the disclosed process, including, for example, the sinusoidal mixing reactor as shown in FIG. 2 replaces mix tank 46 and the hydrodynamic mixer 47.

Water and reagent mixture from tank 46 are fed by pump 2 through contaminated water piping 3a into a cavitation "nozzle" comprising a shell 23 that houses the nozzle's orifice tip 23a. An optional ozonator 52 is also shown in-line prior to the intake of pump 2. The nozzle typically decreases in cross-sectional area from the point of fluid entrance into the tip until it is at its smallest diameter at the nozzle tip orifice where fluid then enters an enlarged cross-section area of the discharge end of the shell 23. The shell 23 may also be tapered from the outlet of the shell 23 back to point where fluid enters the nozzle 23. A wide variety of designs and styles of nozzles may be suitable for use with appropriate engineering and trials that when utilized in accordance with this disclosure. The overall intent of this hydrodynamic cavitation nozzle 23/23a is to increase fluid flow velocity and pressure and then abruptly decrease the flow velocity and pressure when flow enters the enlarged area immediately downstream of the nozzle orifice. This, further enhanced with the pressure drop that occurs when fluid leaves the nozzle shell 23, causes the rapid formation and collapse of cavitation bubbles in the fluid as it enters into the enlarged cavitation chamber 4a of the cavitation reactor 4 and where cavitation bubbles form a bubble swarm 53 as discussed elsewhere in this disclosure specification. An ultrasonic generator (not shown) delivers electric power controlled for frequency, watts, and amperage via the power cables 26 to coaxial terminals 25 connected to the piezoelectric cell transducers 24 where electric energy is converted to acoustic energy in accordance with the ultrasonic output frequency or frequencies of the transducers. The generator controls output to the transducers to increase or decrease power intensity and by modulating the frequency of power delivered to the transducers around their pre-set designs.

As shown in FIG. 1, the cavitation reactor 4 creates both hydrodynamic and acoustic ultrasonic cavitation within the fluid being treated where both cavitation forms are created within the water of the cavitation reactor 4 in its cavitation chamber 4a and the constituents including supplemental reagents carried by the water, and the water itself, cause the formation of oxidizing conditions and chemical oxidants as described in greater detail elsewhere in this disclosure to treat contaminants in water.

The cavitation reactor 4 comprises the hydrodynamic cavitation nozzle 23/23a and the cavitation chamber 4a where cavitation caused by the hydrodynamic cavitation nozzle 23/23a is enhanced from cavitation caused by the ultrasonic piezo-electric cells 24 mounted to the sidewalls of the cavitation chamber 4a within which is the bubble swarm 53. The cavitation reactor 4 is preferably positioned vertically with feed water introduced at the bottom and water egress at the top of the reactor 4 where outlet piping can be fitted with a liquid/gas separation valve 42 if gas removal is needed, for example to remove carbon dioxide or other gases from contaminant destruction. Water is then directed past a monitoring/sensor and control point 21 into the electro-chemical oxidation cell 19 where water and its carried constituents including various oxidants, partially or untreated contaminants, and propagating cavitation bubbles from the cavitation reactor 4 are subjected to the electrochemical oxidation conditions and reactions created by the electrolytic cell. A variety of commercially available ultrasonic reactors may be viable for use in the treatment system described herein, provided that hydrodynamic cavitation is also created within the cavitation reactor, and where a bubble swarm is created that can pass through and egress the reactor 4 such that water is in hydrodynamic and acoustic energy derived cavitation resonance and the bubble swarm can flow into an electro-chemical reactor 19 that is electrically connected at terminals 33 to a power source (not shown). In another preferred embodiment, water from the reactor 4 can enter an in-line static mixer such as the sinusoidal mixing reactor 300 depicted in FIGS. 1A, 1B, and 1C in other preferred embodiments where oxidation reactions can both proceed and be enhanced in all configurations and geometries prior to processing by the electrochemical oxidation cell to accommodate the various ranges of selectivity and rate of contaminants' scavenging by the various oxidants and mixtures thereof.

The system 100 as shown in FIG. 1 has a direct discharge 5 from the electrochemical oxidation cell 19 and illustrates an in-line embodiment of the process equipment, and where another embodiment can be configured as a manufacturing process (incorporating system 200) for a strong oxidation fluid or disinfection solution product 5a produced by the process equipment. In this embodiment, feed water 1 can be sourced from treated or clean water so that the generated oxidant fluid may be retained in a storage tank 46b prior to outlet 5a delivery for use at another time or location. When the oxidizing fluid manufacturing process configuration (incorporating system 200) is preferred as well as with configuration 100, reagent(s) 51A, B, C, D may be selected depending upon the desired qualities of the final end-product. As examples for the configuration including system 200: groundwater, rain, lake or stream, ocean, etc. water and industrial grade supplemental reagents may be desired for a general use; potable water and food grade reagents for another level of quality; and whereas, use of laboratory grade deionized water and high purity analytical grade reagents will provide for uses where impurities would be not be desired as in the pharmaceutical industry or other applications where trace contaminants would be problematic for final use applications for outlet 5a water.

FIG. 1 also shows at least one location where an ozone generator 52 with venturi injection can be positioned before pump 2 in-line 3a prior to cavitation nozzle 23/23a. In this location, the ozone outlet venturi injector of the generator 52 will deliver ozone to the lower pressure water prior to pump 2 that will increase water pressure in pipe 3a prior to the cavitation tube 23/23a. It is well known that ozone gas bubbles will be compressed when under pressure, and the bubble volume, and thus surface area, will be minimized with some ozone advantageously driven into a more dissolved equilibrium state within the water. This will facilitate contact between the gas bubbles, ozone molecules in solution, and contaminants within the water, thus increasing the efficiency of constituent reactions with ozone and overall oxidation reactions within the apparatus.

For both the in-line system 100 and manufactured product (incorporating system 200) processes, a variety of process control sampling ports, monitoring points, sensors, meters, and other instruments' positions 21 may be provided within and between system components. Data and/or sensor signals obtained from these locations may also be used to engage or actuate valves 22, and/or pumps 2 and 2a that may also be manually operated in more basic applications of the process equipment.

Referring to FIG. 1A, the example presented illustrates another configuration of an in-line treatment process of the system 100. Differing from FIG. 1, the supplemental reagents 51 stored in tank 46 are added to the water being treated via a chemical feed pump or pumps 2a that deliver reagents to an in-line manifold 54. FIG. 1A also illustrates serial alignment in singularity of various process components, but with a plurality of serial device sequences that include a sinusoidal mixing reactor 300 and an electrochemical cell reactor 19 with each singular device train positioned on either side of the cavitation reactor 4. Multiple process control and monitoring points 21 are depicted throughout the system 100. One benefit of this configuration and serial device alignment of a plurality of components is to provide additional oxidation conditions that may be needed to further polish the water being treated, and yet another important application would be where more easily oxidized substances or a high loading of substances are treated in the first series of components and the cavitation reactor, and then subsequent treatment is performed where concentrations of remaining substances, and/or oxidation by-products and intermediaries are then treated prior to discharge. While not shown, yet another embodiment would be the addition of yet a third, or more, serial system(s), with or without another cavitation reactor 4.

FIG. 1B, like FIG. 1A also includes an in-line delivery method of supplemental reagents. Unlike FIG. 1A, however, FIG. 1B includes a flow divergence where water splits into a parallel plurality of single system components consisting of a sinusoidal mixing reactor 300, an electrochemical oxidation cell 19 and a cavitation nozzle 23/23a. Flow confluence from the nozzles is within the cavitation chamber 4a of the cavitation reactor 4. Another embodiment illustrated in FIG. 1B is the inclusion of an optional or alternative transducer rod 24a (provided in addition to or substituting for transducers 24) that is inserted along the vertical centerline of the cavitation reactor 4. The rod 24a may be sized based on frequency, diameter, length, and material of construction. The positioning of the rod within the chamber may also be offset from the centerline and accompanied by additional rods to provide a plurality of rod transducers that may be of the same or different frequencies and geometric measurements. While FIG. 1B depicts four (4) transducers 24 mounted to the sidewalls of the reactor chamber, and a single transducer rod 24a, the transducers 24 may be reduced in number and adjacent to or opposing others across the chamber, depending on performance of a single or plurality of rods on any given fluid and its constituents being treated if a rod or rods are provided.

FIG. 1C presents yet another example of a singularity and plurality of equipment components. It illustrates an in-line processing with a singular reagent manifold 54 for supplemental reagent delivery, and then fluid divergence into a plurality of singular process components serially aligned where components include a sinusoidal mixing reactor 300, an electrochemical oxidation cell 19, a cavitation reactor 4, another sinusoidal mixing reactor 300, and yet another electrochemical oxidation cell 19 before fluid converges prior to its outlet 5. A benefit of this configuration, with the potential to increase the plurality using multiple serial alignments allows for increased retention, thus process time within the system without decreasing feed flow rate. Process redundancy from parallel systems will also allow for servicing any single serial alignment without requiring shutdown the entire processing system. Another benefit would be to utilize a singular parallel system for treatment of a single absorber in a treatment train (Figure Series-6). Still another benefit would be to achieve treatment objectives for the entire process where two or more constituents are problematic and require slightly different process variable settings and that the blended end-product meets all discharge or treatment objectives relative to overall contaminant concentrations and their respective destruction within each singular device alignment. Without diverging from the present invention, component sequencing order can be adjusted within series alignments of illustrated components between the plurality of alignments such that the combined outcomes of the re-sequenced, or differently sequenced component alignments produce a composite outcome of treated water that meets overall treatment objectives for the fluid being processed.

The components of the systems 100 and 200 depicted in FIGS. 1, 1A, 1B and 1C and optional devices also embodied in this disclosure that contact water being treated and various supplemental reagents should be made from materials that are inert and non-reactive to the severe cavitation and oxidizing conditions created within equipment components. Further, materials should not contribute or leach constituents into the fluid as a result of contact and direct exposure to the fluids and their characteristics. Ideally, high quality stainless steel is the preferred material, however, ceramics, plastics, aluminum, steel, etc. can be used for specific applications where less harsh operating objectives are followed, noting that any material that contacts fluids being treated will be exposed to both corrosive and erosive conditions within the cavitation and other reactors. Further, and specifically for cavitation components to be most efficient, the materials should not dampen or absorb the energy within the cavitation chambers that would compromise critical cavitation bubble formation and collapse. Electrochemical oxidation cell electrode components are discussed elsewhere in this specification, however with respect to cell housings that hold electrodes and/or contact the fluid, they should have similar properties to those discussed above, however, conductivity between component parts must be properly insulated and grounded to eliminate unwanted conductivity, short-circuiting, and certainly for safety.

Sinusoidal Mixing Reactor

FIG. 2 depicts an embodiment of an in-line flow-through sinusoidal serpentine pipe/tube mixing reactor 300 suitable for use in the system described herein. The mixing reactor as depicted shows various feature examples that can be incorporated optionally and singularly or in plurality into its design for functional mixing of aqueous fluid or water with reactants created by or delivered to the mixing reactor 300 and received by or released to the system described herein. Supplemental to blending water with its constituents, the unit 300 provides additional time for various reactions to occur while importantly providing for additional oxidation and other embodiments, depending upon the various optional devices incorporated into the design of the unit for any given application. The mixing reactor causes limited backpressure and hydraulic head loss while also serving as a passive flow-through mixing and reaction device for reactants in the fluid. An in-line component as that depicted, or one that provides the same functionality, may be inserted at any location between or after various process components of the water treatment system to maximize desired mixing and process reaction performance outcomes. As illustrated in the FIG. 1-series, the mixing reactor 300 is positioned after supplemental reagent addition to water before it is processed by the electrochemical oxidation cell 19, and also after the cavitation reactor 4. In another embodiment that is not shown, the mixing reactor may alternatively be positioned after either or both of the electrochemical oxidation cells. In either configuration sequence, water in hydrodynamic and acoustic cavitation resonance is critically and preferably delivered through the mixing reactor to the electrochemical oxidation cell as embodied in the present invention.

When installed within the water treatment systems described herein, the sinusoidal serpentine mixing reactor 300 shown in FIG. 2 provides for in-line mixing and/or reactions of a flowing fluid with and between its carried constituents, including those that may have been generated in a process system component upstream of the fluid inlet 3, and/or when supplied to the fluid in or prior to entering the mixing reactor. It is well reported and known that in-line mixing is accomplished by means of increasing contact areas of striated flow caused by differential velocity between layers of flow within the fully flooded pipe or tube. Unlike other serpentine mixing devices, the mixing reactor described herein includes: decreasing and increasing pipe/tube alignment curvature radii 45 (for example R1, R2, R3); constriction 43 and expansion 44 of pipe/tube cross-sectional area; gas outlet(s) 42; optional in-line screen, catalyst retaining/granular solid extraction/reaction enhancing devices 34 (e.g., also UV reactor 34a); a lack of flow obstacles such as pipe/tube joints or fittings, paddles, blades or other abrupt flow impactors and no motorized or energy consuming hydrodynamic devices so that fluid leaving the unit at the fluid outlet 5 is mixed adequately for subsequent treatment, processing or discharge with limited pressure drop. To further differentiate from a conventional serpentine mixing device, the mixing reactor also provides for the generation and delivery of oxidants via the ozone generator and injection feature 52 coupled with enhancing devices 34 (e.g., also UV reactor 34a) to facilitate contaminant and constituent alteration, i.e., the formation of new oxidants, and the oxidative destruction of the contaminant substances and compounds.

As shown in FIG. 2, the tube includes curvilinear radii changes 45 spaced along the overall plane of the unit within the pipe/tube run length of the mixer. The unit may be constructed from a variety of material choices such as stainless steel, HDPE, PVC, etc., however, its longevity and resistance to degradation from the chemistry and other characteristics of the fluid being treated are necessary design criteria, particularly with the strength of the oxidants being created, as well as potential contamination sourced from the materials of construction that may contain PFAS bearing telomeres such as PFOS and PFOA among others in TFE or PTFE common in pipe fitting joint compounds.

In-line mixing performance is based upon flow velocity differentials of fluid flowing within a flooded pipe or tube and the low viscosity and low Reynolds number of aqueous fluids. The velocity of a flowing fluid in a closed channel or pipe is greatest within the core of the fluid's flow due to the lack of a friction surface created by the pipe/tube wall. However, in a radius of smooth-bent pipe/tubing 45, the water flow within the pipe/tube travels longer distances on the outside of the radius, and slower on the inside of the radius. This imparts differential velocity layers within the water volume present within the length of the tube bend(s). As flow approaches a pipe alignment curvature 45, it moves towards the outer pipe/tube wall due to centrifugal force, thus creating velocity and micro pressure gradients yielding vertical flows, and thus mixing. Secondary flow growth due to a change in curvature (R-1, R-2, R-3) from a straight alignment to bent, back to straight, and then bent back in the other direction (sine wave pattern) causes transverse directional fluid flow that shifts flow vortices as flow encounters the curvatures 45 between the pipe sidewalls and the central core where less friction exists to slow velocity.

Further mixing will result from differential flow velocity within a pipe run bend by providing several varied changes in bend radius (R-1, R-2, and/or R-3) turn sharpness. As the curvature radius is reduced and the bend sharpens, fluid velocity differential increases within the pipe through the radius curvature run. As the curvature radius increases, velocity differentials decrease causing more changes in flow patterns, thus enhancing mixing.

Another blending feature of the disclosed mixing reactor is provided by constriction 43 and enlargement 44 of the pipe/tubing diameter using welded bell or such taper/flare fittings without inclusion of turbulence causing obstacles such as paddles, blades, or deflectors that create local strain to passing fluids and carried solids. By changing the pipe cross-sectional geometry of the pipe, fluid velocity also differentiates as fluid passes through the pipe diameter geometry transition. Under constant pressure and flow, velocity will increase as the diameter decreases, and will decrease as the diameter decreases. As with alignment curvature, cross-sectional area changes disrupt flow layers and cause transverse velocity patterns that increase the interaction and contact of water with and between its carried constituents.

Process control sensors and monitors 21 should be installed prior to and/or after serpentine pipe/tube bends to evaluate mixer performance, reaction status, and/or operating conditions at locations where such monitoring is desired. An adequate distance between the monitoring location and the nearest tube/pipe geometry change will likely be required based upon monitoring/sensor manufacturer recommendations. Typically, a distance of ten (10) times the radius is adequate. Gas/liquid separation and gas removal valves 42 may also be added where gas may collect at various locations along the length of the mixing tube 300, and/or depending upon the spatial orientation of device when installed.

An in-line magnet/screen, catalyst retaining/granular solid extraction/reaction enhancing capture/containment device 34 is intended to show the inclusion of a device or devices that can be located at any number of locations within this unit, or other components of the water treatment system. The devices of this unit 34 may include material screens to remove debris and large particles such as small media fines, to retain and position granular catalyst in-line with fluid flow to facilitate reactions, and/or include external magnets that help excite constituents, or align those that are polar charged constituents within the fluids to facilitate reaction, or to remove particles and fines that respond to magnetic fields (such as ZVI) that carries downstream from the media reactor chamber. For ZVI, particle fines will be magnetically held against the inner wall of the mixing reactor. The installation for this functional unit may be at the bottom of a curvature and include a cleanout portal for maintenance servicing, however ZVI particles, such retained, may provide further benefit to process reaction with their presence. The locations of the capture/containment device 34 and other features herein described are depicted in this FIG. 2 is intended to show that the functions such an installation provides is or are part of the described embodiments, and do not specify an exact location within this device, or to differentiate between the functions of the device 34 or others herein disclosed.

In another embodiment shown on FIG. 2, the tube reactor includes a generator for ozone 52 where ozone is venturi injected into the fluid flow prior to velocity and pressure increases caused by the tube diameter constriction 43. As a gas with a strong oxidation potential, ozone can be limited in its ability to oxidize various contaminants due to the water-gas interface at the surface of the ozone bubbles and their respective surface areas. When pressure is increased on the fluid at the tube constriction 43, gas bubbles will decrease in size, thus decreasing their surface area and have a greater ability to react with target organic constituents that are dissolved in the water. Further, with adequate pressure, ozone may also enter a preferable dissolved state where liquid-liquid interaction at the molecular level with contaminants is facilitated and oxidation reactions are more efficient.

Figure 2A:
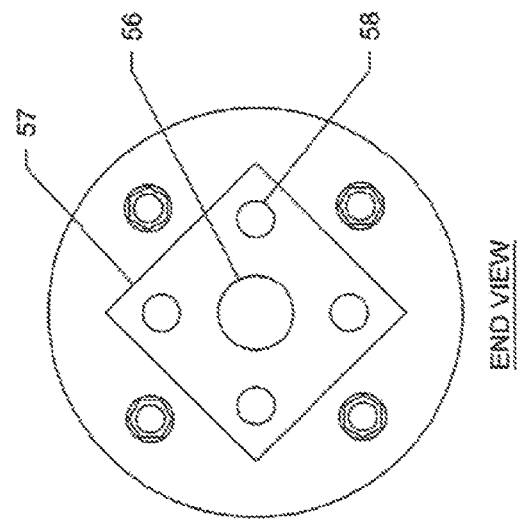
FIG. 2A illustrates an embodiment of an ultraviolet light reactor suitable for use as an optional component of the overall system described herein.
Figure 2A:
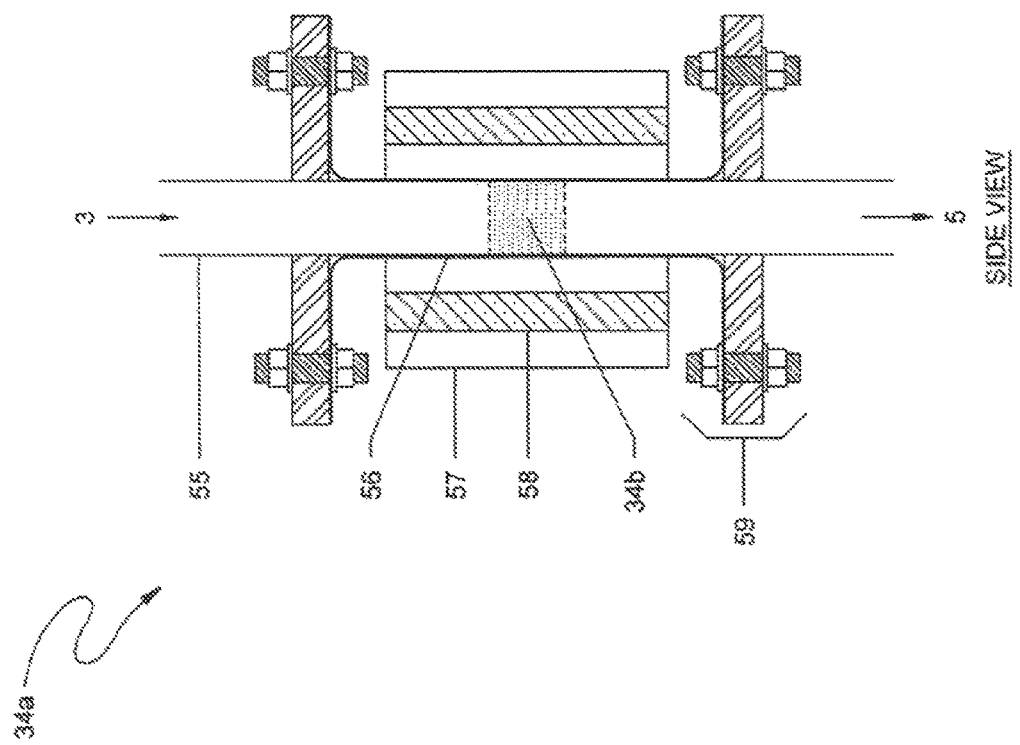

FIG. 2A shows an embodiment where the enhancing device 34 is specifically an in-line ultraviolet (UV) light reactor installed in the tube reactor 300 downstream from the ozone injection 52 and the tube expansion 44 where the flow velocity will decrease. In the presence of UV light, ozone will form powerful hydroxyl radicals with elevated oxidation potential that will attack oxidizable contaminants. With a decrease in flow velocity, contact time between hydroxyl radicals and contaminants will increase. Wavelengths of UV lamps 58 can be varied and optimized to achieve suitable oxidation of various compounds, or to provide for disinfection sterilization of biological species. Catalysts can accelerate chemical reactions without contributing reactants to the overall reaction. The UV reactor 34a detail as depicted in FIG. 2 includes a media screen 34b that can be used to retain catalyst in the fluid flow and within the influence of UV light. The UV reactor 34a as shown is a bolt-in device comprised of a high quality optical quartz glass tube 56 that is flared to a flange at both ends and fitted in-line with the tube of the reactor 300 between two mixing tube flanges 59, secured with a chemically resistant gasket and flange-to-flange bolt-kit 59. The detail shows by example an embodiment where UV lamps 58 are positioned within a protective UV lamp housing 57 and outside of the optical glass 56. Other designs and commercially available devices for UV irradiation of water in a pipe 55 are also suitable for inclusion in the sinusoidal mixing reactor 300.

Yet another benefit of the mixing reactor embodiment is to allow reactants, either added to the fluid or created by the treatment components of the invention, and their reactions to proceed due to mixing and reactant contact within the sinusoidal unit 300. Mixing will be more laminar than that of other turbulent static/hydrodynamic mixers, thus minimizing backpressure through the unit.

Another embodiment of the mixing reactor not shown in FIG. 2 is a change in length of pipe/tube runs (legs) between curvatures. Leg lengths can be all the same dimension, or leg length may be varied throughout the device to further facilitate mixing and reactions. Also not depicted in FIG. 2 is the positioning or orientation of the mixing reactor 300. It may be placed so that serpentine pipe plane is flat and parallel to the ground, or the plane rotated with the inlet 3 at the bottom and the outlet 5 at the top. These orientations may either facilitate performance and/or accommodate the space available for its location within a system at the site of the system's application. The UV reactor may be installed vertically or horizontally within the mixing reactor 300, or operated in an up or downflow position. A gas/liquid separation portal and valve may be appropriately provided and located when needed to remove any generated or accumulated gas.

The mixing reactor described herein provides a high mixing index, increases residence mixing/contact/reaction time with an increase in overall length and the quantity and frequency of features herein described, provides low resistance to flow thus reduced head loss with lower pump energy demand without need of a motor driven or passive flow blocking obstacles such as ribbons, spindles, paddle or flow diversion arrays, and also contribute to the oxidant formation and subsequent oxidation reactions. Importantly, the design of the mixing reactor allows for the passage of water in cavitation for electrochemical oxidation cell 19 processing if the cell is positioned downstream of the mixing reactor 300.

A plurality of sinusoidal mixing reactors can be arranged in parallel with individual units connected to a flow splitting control manifold positioned prior to the inlet 3 and after the outlet 5 of each unit, or in subsequent serial configuration. These configuration arrangements can accommodate situations where flow rate from the water source fluctuates or is intermittent, or if more or less mixing and retention time is needed to facilitate desired results. Other Figures of this specification present other options for the insertion location of the tube mixer 300 into the system.

Cavitation Reactor

Figure 3:
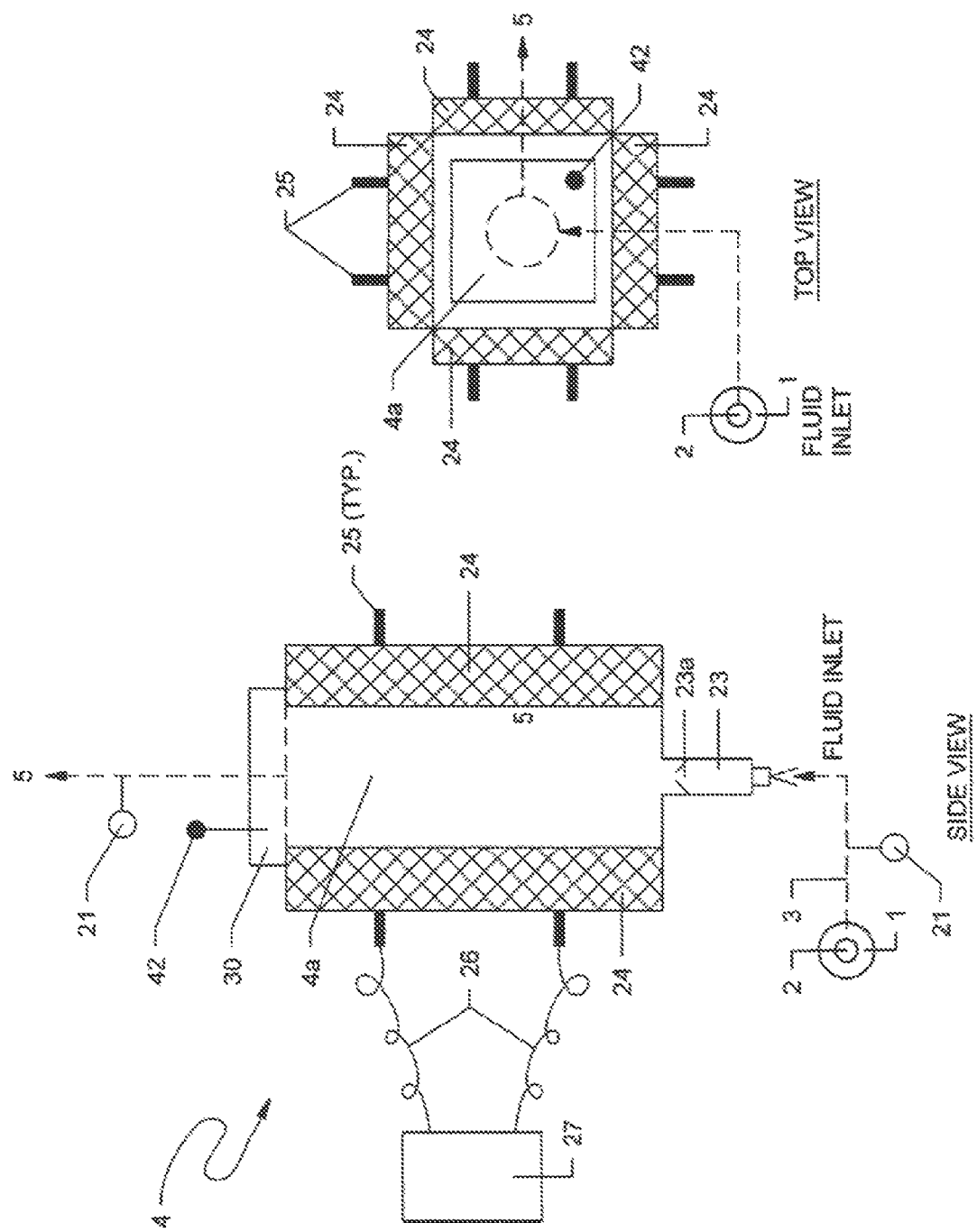
FIG. 3 illustrates a flow-through hydrodynamic/acoustic energy cavitation reactor in accordance with various embodiments of the technology described herein.

FIG. 3 depicts a single cavitation nozzle 23/23a with its shell tube 23 and a nozzle tip fitted tip 23a flow-through fluid dynamic acoustic cavitation reactor 4 where hydrodynamic and acoustic cavitation of water being treated is created within the same cavitation chamber 4a. Fluid from a source 1 that may include raw system feed water, or water from another component, e.g., a sinusoidal mixing reactor 300 in FIG. 2, or an electrochemical oxidation cell 19 in FIG. 1-series is fed by a high pressure pump 2 via a pipe inlet 3 to the hydrodynamic cavitation nozzle's 23/23a tube shell 23 where the flow is greatly restricted and fluid velocity and pressure are increased by the cavitation nozzle shell 23 and tip 23a. Immediately upon passing through the orifice of the nozzle tip 23a, the flow enters the enlarged cross-sectional area of the tube shell 23 egress and the further enlarged area of the cavitation chamber 4a within the cavitation reactor 4. Because of the differential drops in fluid pressure (>25 psi for the reactor 4 shown) and velocity immediately upon departure from the nozzle tip 23a, cavitation bubbles are created and combine to form a bubble swarm 53 (shown in FIG. 1). Within the cavitation chamber 4a, the hydrodynamically cavitated water is also subjected concomitantly to ultrasonic acoustic cavitation effects from the piezoelectric cell arrays 24 of the reactor 4. Ultrasonic energy is created by the ultrasound power generator 27 delivered by power cables 26 connected by terminals 25 to the piezoelectric cell arrays 24 where electric energy is converted to high energy acoustic energy at frequencies ranging from 10 kHz to over 500 kHz, but where typical frequencies are at 25, 40, 68, and/or 176 kHz, or in combinations, thereof, respectively. Frequencies of 25, 40, and 68 kHz are well suited for the purposes of this technology, although lower or higher frequencies may be required for specific contaminants in various complex aqueous waste streams that can be selected through optimization treatability studies using the apparatus and various configurations disclosed and embodied herein.

Of particular importance to some embodiments of the technology described herein as discussed elsewhere in this disclosure, is the oxidation potential latency and cavitation bubbles that carry from the reactor 4 via the fluid outlet 5 to and through a sinusoidal mixing reactor 300 where oxidation reactions are continued and enhanced to achieve desired contaminant destruction immediately within the follow-on device. In a preferred embodiment, an electrochemical oxidation cell 19 shown in FIGS. 1-series, for example, immediately receives the actively cavitating fluid flow with bubble swarms 53 from the outlet 5 for enhanced oxidation of contaminants and intermediary by-products by oxidants created in the reactor 4 and the cell 19 of FIG. 4 from the operating conditions and supplemental reagents that form ionic radicals with elevated oxidation potentials, See Table 1 elsewhere in this specification.

A liquid/gas separation portal 42 may be provided to remove gases from the reactor 4 that form during oxidation reactions. As shown in the figures, vertical positioning is desirable with an up-flow operation to prevent the accumulation of air and gas within the cavitation reactor device 4, although horizontal operation can also be effective.

The untreated water inlet 3 and treated water outlet 5 may be fitted with various instruments and devices 21 for monitoring and controlling the device while in operation, and/or for sampling water for other testing and analyses. Process control sensors and monitoring devices 21 will allow for data gathering for process operation variable determinations and/or conversion to programmable signals to control flow, pump rates/pressure, valves, electric current and ultrasonic energy generation and other process control adjustments.

Figure 3A:
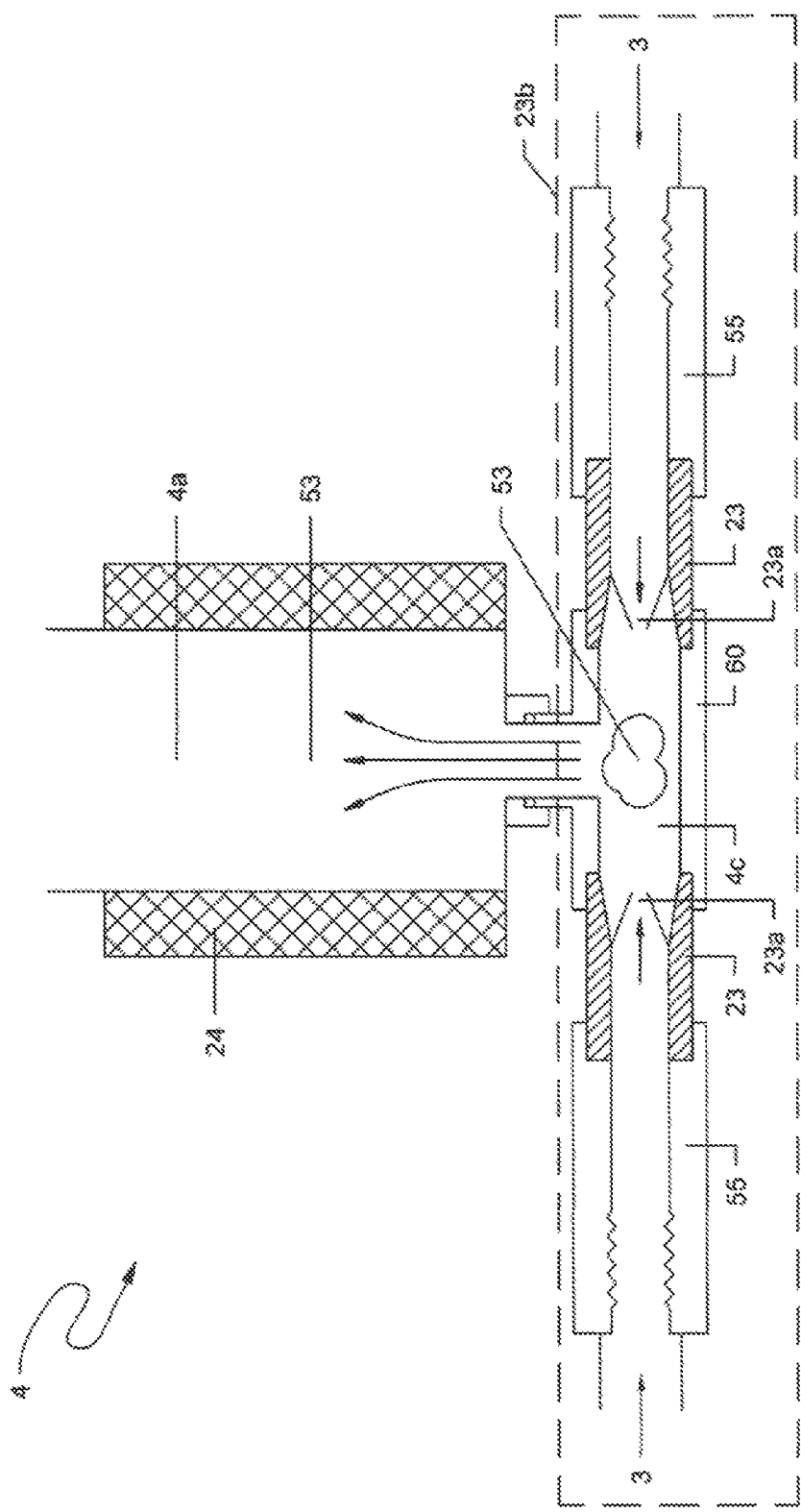
FIG. 3A illustrates two opposing cavitation nozzles in a bubble swarm "collider" configuration that can replace a single nozzle on a cavitation reactor.

FIG. 3A shows another embodiment where a dual collider nozzle assembly 23b replaces a single cavitation nozzle 23/23a. In the collider assembly 23b, single nozzles 23/23a attached to feed fluid piping 55 are aimed to directly oppose each other when mounted in a "T" or yoke 60 where within jet streams from the nozzle 23/23b collide in chamber 4c that releases actively cavitating water and a bubble swarm 53 into the cavitation chamber 4a of the cavitation reactor 4. Bubble swarms from each nozzle 23/23a collide directly head-on in the chamber 55 of yoke 60 to impart more energy between the directly opposing cavitation bubble swarms and dynamic fluid flow. To further optimize effects of the dual nozzle collider device 23b, operating feed pressures and flow velocities of each nozzle 23/23a can be altered from each other, and different tip 23a diameters can be selected to further alter cavitation bubble and bubble swarm characteristics to achieve desired treatment objectives. In another embodiment of the hydrodynamic cavitation nozzle collider device 23b, the distance between each opposing nozzle 23/23a can be changed by elongating or shortening the length of the yoke 60. Other changes in nozzle geometries including shell and yoke diameter, nozzle tip orifice diameters and shapes that are also embodied can be designed to produce specific or custom outcomes with respect to hydrodynamic cavitation within the reactor chamber 4a when also combined with sonication sourced from the acoustic energy transducers and piezoelectric cells.

Electrochemical Oxidation Cell

Figure 4:
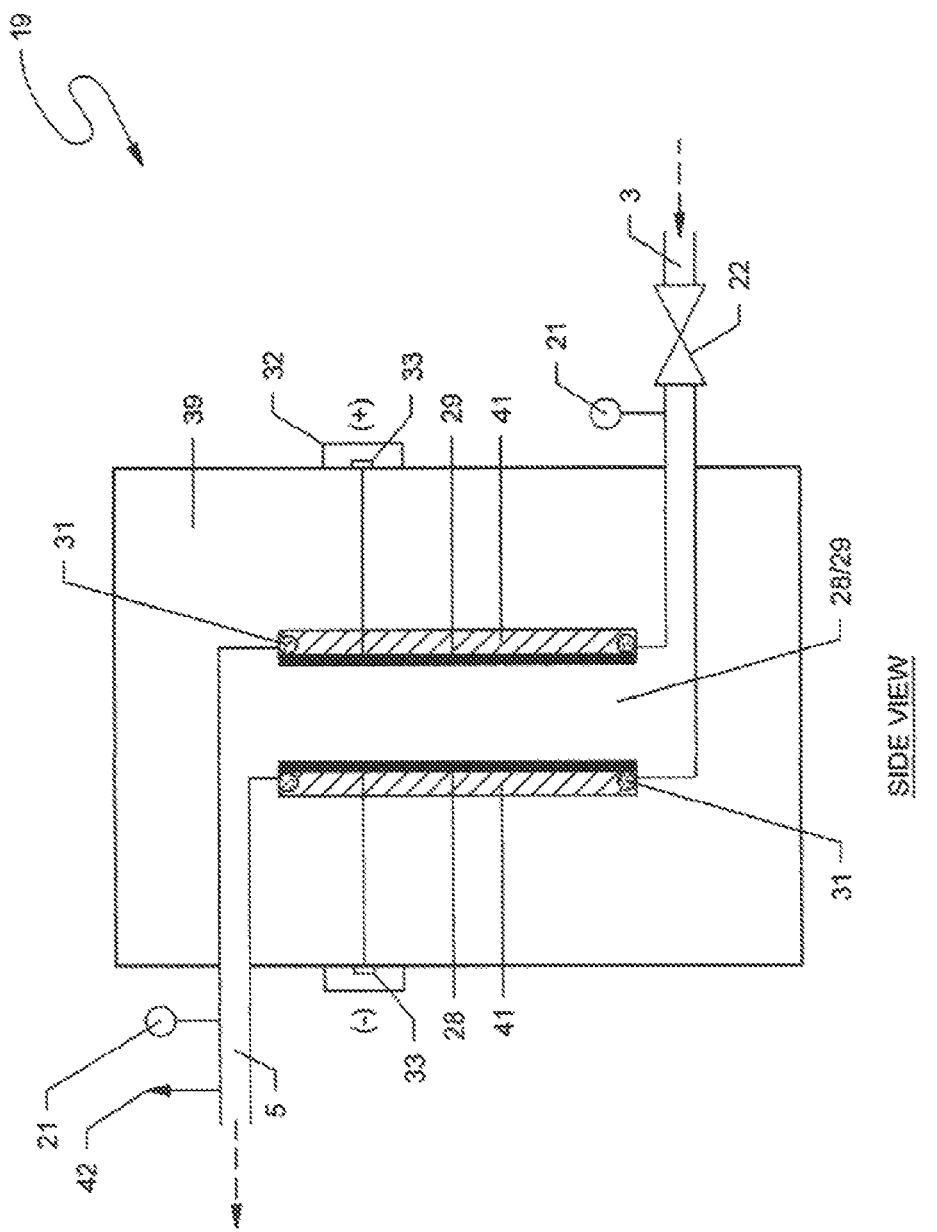
FIG. 4 illustrates an electro-chemical cell that introduces/induces/initiates/performs electro-chemical oxidation reactions between contaminants, water, supplemental reagents and/or those substances produced by and within the conditions created by the technology described herein.

FIG. 4 depicts an electro-chemical oxidation cell 19 that induces oxidation reactions as a component of the present technology. Fluid feed via inlet 3 (sourced from other components of the system, for example a cavitation reactor 4 shown on FIG. 1, or a sinusoidal mixing reactor 300 shown on FIG. 2) enters cell 19 as may be controlled by a manual or automated valve 22 and that can be adjusted based on data derived or otherwise obtained from monitoring and control sensors/instruments/sample tap components 21 installed at the fluid inlet 3 and/or in combinations of data and trigger points obtained from sensor/monitoring components 21 at the fluid outlet 5 from the cell 19. Fluid outlet 5 may also be controlled by a manual or automated valve (not shown in FIG. 4). Upon entry to the cell 19, fluid flows into the electrode gap 28/29 created preferably by dimensionally stable electrodes, e.g., an anode 28 and a cathode 29 set in parallel to each other and separated by 1-12 mm. Electrodes 28 and 29 are connected at terminals 33 under a terminal cover 32 by wiring (not shown) to a DC power source (not shown) that controls current voltage and amperage to deliver the desired current density for the electrode surface area of the provided device and to achieve oxidation conditions optimized with the other system components to achieve desired water treatment outcomes. By supplying power with polarity reversal capability, electrode cleaning may be accomplished as part of an operational operation and maintenance plan.

Preferably, the electrode materials are dimensionally stable, not sacrificial, and made from boron-doped diamond (BDD), tungsten, stainless steel, graphite, graphene, tungsten, or other suitable reactive-surfaced conductive non-deleterious material that will cause the necessary electrochemical oxidation reactions with the water and its constituents to benefit treatment or be treated at appropriate current densities and power wattage. In a preferred embodiment, the anode 28 and cathode 29 is boron-doped diamond on a niobium substrate, and the anode 28 electrode is tungsten where the boron-doped diamond electrode provides a wide electric potential range. As an electrode pair, the anode 28 and cathode 29 create an electrode gap 28/29.

The electrodes 28 and 29 are sandwiched or secured within a tight, close tolerance housing 39 and are seated with an appropriate leak preventing gasket or seal 31 and structurally backed against a supportive, non-conductive insulating barrier 41 for a single sided BDD electrode. Together, electrodes form a pair and create the electrode gap 28/29 ranging from 1 or 2 mm to 12 mm, depending upon characteristics of the fluid being treated (including fluid conductivity), and performance response to reactions facilitated by the cell 19. The housing 39 may be modified to more closely resemble those in FIGS. 5A-5C when using double sided electrodes, a stack or bundle of paired electrodes, or a plurality of electrodes are desired with dual-sided reactive surfaces.

Fluid egresses the electrode gap and the cell via the fluid outlet 5, passing another array of sensors and monitoring devices 21 and an optional gas/liquid separation portal 42 to remove gas that may be generated by the cell and reactions within the fluid. A control valve (not shown) may be used to control flow as needed. Fluid that exits from the cell outlet 5 may be directed to other components, such as the sinusoidal mixing reactor 300 shown on FIG. 2, or a storage tank 46b of FIG. 1, or other invention components shown in other Figures. Another preferred embodiment is the positioning of the electrochemical oxidation cell 19 so that it directly discharges into a cavitation reactor 4, however, the electrochemical oxidation cell 19 must be able to withstand operational water pressure required to cause the pressure differential across the cavitation nozzle or nozzles.

A single cell 19 or a plurality cells in parallel or serial configuration can be provided in the water treatment system described herein to process flow rates and/or aqueous fluid constituents of any given application. An electrolytic oxidation cell or cells can be combined in parallel to each other and in series before or after a single or plurality of cavitation reactors to generate or enhance the generation of hydroxyl and other oxidant radicals that react with fluid-contained constituents to affect their oxidation (loss of electrons) and subsequent organic substance destruction. Some examples of a single cell 19 in a plurality of cells are shown in FIGS. 1B and 1C. As such, the cell 19 or cells may be installed within the water treatment system prior to, between, or after other components of the disclosed system to better optimize overall performance, equipment and operating costs, and the overall efficacy in achieving desires treatment objectives.

Large Cav/ECO Reactor

Figure 5B:
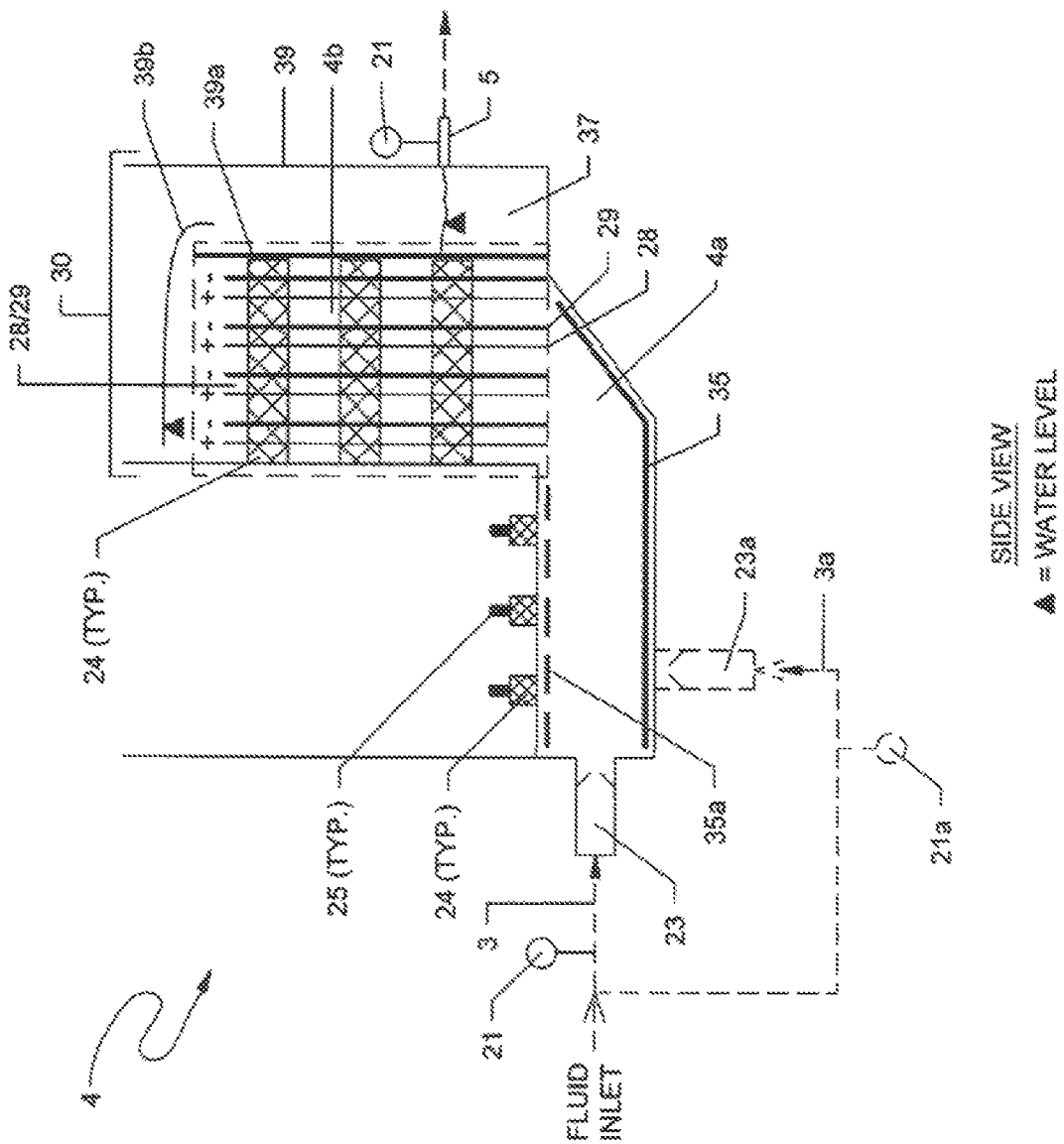

FIGS. 5A, 5B, and 5C illustrate various configurations of the fluid dynamic and acoustic cavitation (Cav), and electrochemical oxidation (ECO) cell components combined in a larger integrated Cav/ECO reactor 4 that includes a cavitation chamber 4a and an electrochemical oxidation chamber 4b suitable for use in the systems described herein. The figures show: fluid feed inlets; hydrodynamic cavitation nozzle(s); ultrasonic acoustic energy piezoelectric cell transducers; electrode pairs and bundling configurations; ultrasound and EC power supply; optional cavitation target plates; a reaction equalization chamber and fluid outlets, all of which integrate to enhance performance as a combined unit. Not shown but still embodied as a part of the integrated system is an optional sinusoidal mixing reactor 300 of FIG. 2 that can be placed before and/or after the Cav/ECO reactor 4 in embodied in FIG. 5-series. The type of unit presented in these figures represent a basic embodiment of the disclosed system. Other styles, geometries, and/or configurations of the units represented in these figures are also possible in systems when inertial and non-inertial cavitation and electrochemical oxidation are provided to concomitantly benefit or derive benefit from other components of the system and process water in a combined reactor unit and overall treatment system 100 (or 200).

The untreated water inlet 3 and treated water outlet 5 may be fitted with various instruments and devices 21 for monitoring and controlling the device while in operation, and/or for sampling water for other testing and analyses. Other components not shown but which may be provided in the feed line 3 or the discharge line 5, and include magnets, screening baskets, and/or retaining or extraction/filtering devices (not shown) as discussed elsewhere in this specification, as well as a sinusoidal mixing reactor such as the one illustrated in FIG. 2.

FIGS. 5A, 5B, and 5C depict multiple views of a flow-through multi-chamber tank-like containment reactor 4 where both a cavitation reaction chamber 4a and an electrochemical oxidation reaction chamber 4b are provided in a single component 4 to increase treatment flow capacity of the system described herein, while also being able to process more complex aqueous fluids characterized by more constituents and/or of higher concentration. As shown in this Figure-series, a difference in depicted configurations is the direction at which fluid is delivered through the hydrodynamic cavitation nozzles 23/23a, whether horizontal or vertical. Other differences and variations are also possible and embodied within the Cav/ECO reactor 4 described herein. While Cav/ECO reactor 4 unit is illustrated in singularity, it may be provided as a plurality of reactors 4 in parallel or serial to each other.

The geometry of the unit shown in FIGS. 5A, 5B, and 5C is intended to allow for the processing of increased water flow, increased retention time, and/or impart expanded influences of cavitation and/or electro-chemical oxidation for more complex and/or recalcitrant fluids and their constituents. The anode 28 and cathode 29 electrode pairs 28/29 in the illustrated examples can be horizontally stacked in bundles where opposing sides of an adjacent specific electrode pair create another functional electrode gap for process reactions. FIG. 5C provides an end view of the reactor 4 in which a plurality of cavitation nozzles 23/23a are aligned horizontally, although other alignment patterns, such as vertical as shown, may be alternately or dually combined and provided to expand the resultant cavitation field dimensions within the chamber 4a. Water levels are also shown above which electrodes 28 and 29 of a bundle are respectively connected at alternative tabs by terminals and wiring 33 on FIG. 5C to the power supply (not shown). Detail A of FIG. 5A shows a non-conductive spacer bracket 41 with appropriate insulated channels 31 to secure each electrode and to minimize movement and prevent direct contact with other electrodes. Channel brackets 41 are fixed to the vertical side wall of the housing 39 in alignment such that individual electrode plates may be slid down each of their respective channels so singular electrodes may be readily serviced. As part of the overall housing 39, a locking protective safety cover 30 is provided.

As shown in FIG. 5C, water flows upward around individual electrodes through electrode pair surfaces of the electrode gap 28/29 (described elsewhere in this specification). As active water and the bubble swarm generated in chamber 4a enters chamber 4b, water is subjected to the additional oxidation effects and impacts caused by the electrochemical oxidation electrodes. Further the water in chamber 4b, its constituents, and electrodes are also irradiated with acoustic sonication energy provided by additional transducers 24 mounted to the housing 39 of chamber 4b with terminals 25 connected by cables 26 to the power generator 27 (shown in FIG. 5A). In reaction chamber 4b that receives cavitated fluid from the lower reaction chamber 4a, water is also subjected to both cavitation and electrochemical oxidation, as well as the cavitation bubble swarm that originates in chamber 4a and propagates into chamber 4b. While these Figures prospectively depict two chambers 4a and 4b, use of chamber 4b without acoustic cavitation in chamber 4a is also an embodiment where the combined oxidation effects of hydrodynamic and acoustic cavitation, electrochemical oxidation, and chemical oxidation from oxidants and oxidizing radicals are formed and conditions are created within the depicted Cav/ECO reactor 4 to destroy oxidizable materials, substances, and compounds carried by water to be treated.

At the top of the electrodes 28 and 29 within the housing 39, water flows across the overflow weir 39a as shown in FIGS. 5A and 5B and creates a nappe 39b as it falls into the reaction and flow equalization chamber 37. Water from this compartment departs the unit through the outlet 5 and appropriate control and monitoring 21 for the process. A pump (not shown) may be provided to facilitate fluid transfer and conveyance should gravity drainage not be acceptable or adequate for subsequent fluid handling.

It is noted that all forms of cavitation can be deleterious to various materials via erosive and corrosive effects. As such, spatial geometric placement of cavitation nozzles, their shell and tip designs, cavitation chamber design, and fluid flow rate and pressure may require optimization to minimize excessively harsh delivery of bubble swarm to chamber 4b where the electrodes are positioned to maximize their longevity. Similarly, the acoustic transducer 24 spatial positioning, frequencies, and level(s) of applied power should similarly be optimized in chamber 4b in conjunction with methods to generated cavitation that originate in chamber 4a. An option to protect electrodes, primarily along their edges, can include an armoring channel or protective frame. Yet another option to minimize deleterious effects to the electrodes would be minimize their exposure to intense bubble swarm by shortening the length of the overall electrode bundle geometry as well as adjusting their width along with the geometry of the reactor 4 and its housing 39 so as to maintain or provide adequate electrode surface area to achieve the desired output yet distancing them from the intense portion of a bubble swarm.

In the depicted larger Cav/ECO reactor embodiment of the present invention, FIG. 5A provides a top view of a suitable reactor 4 where both cavitation and electrochemical oxidation are applied to water and its constituents. Water from the source 1 or an upstream component of the system is pumped via pump 2 or delivered into the feed inlet 3 piping manifold that directs flow (control valves and monitoring devices not shown) to the horizontally aligned plurality of single cavitation nozzles 23/23a affixed to the lower end of cavitation chamber 4a. All or some of these single units may be replaced by cavitation collider assemblies 23b depicted on FIG. 4B. In another embodiment, the nozzles 23/23a may be installed in the bottom of the chamber 4a for up-flow into chamber 4a during operation of the reactor 4.

With respect to FIGS. 5A, 5B, and 5C, aqueous fluid to be processed is delivered from the source 1 by a pump 2 or another system component via inlet piping 3 through one or more of the cavitation nozzles 23/23a into the cavitation chamber 4a. Depending upon cavitation nozzles' 23/23a design, positioning (horizontal or vertical), aim, operating variables, and desired performance criteria of the reactor 4, optional cavitation target plates 35/35a (FIG. 5B) may be appropriately mounted in the chamber 4a. For an end-mounted horizontal nozzle 23/23a, or collider 23b on FIG. 3A, target plates 35 may be desired, and for the vertical upward CavNoz 23a positioning, target plates 35a can be used with positioning to accommodate the upper transducers 24. Ultrasonic transducer arrays 24 mounted with power terminals 25 connected to a power supply (not shown) are provided above the chamber 4a to irradiate water within. An added benefit of the target plate 35 positioning is allowing for targeting of both cavitation sources. A target plate 35 can be mounted on the flat and sloped floor section of the unit housing 39 that inclines to the combined ECO chamber 4b. In this arrangement, target plate 35 is impacted by horizontal nozzle 23/23a, but also serves to deflect cavitation bubble swarm up to the ECO chamber 4.

Target plate material can be selected to provide acoustic energy dampening, deflection, or cavitation erosion of small plate material particles or nanoparticles that become reactants or otherwise participants in the reactions to treat various compounds and substances. Examples of suitable target plate materials are graphite, ceramics, and/or metal such as iron, aluminum, or copper, for example, however these specific materials are not identified to limit the field of invention with respect to target material selection. Suitable materials for target use are not limited to those indicated within the present disclosure and may vary where different materials may provide differing contributions and benefits to the desired reactions. One example of a target plate material is iron where small iron particles (ZVI—zero valent iron: $Fe^0$) generated by cavitation erosion may provide adequate iron dosing where ZVI will lose electrons within reactions of the present technology to form ferrous iron ($Fe^{+2}$), and where ferrous iron will form ferric iron ($Fe^{+3}$) with lost electrons being available to remove chlorate, borate, nitrate, or other axo-ions from water by reduction, should one or more of these ionic species be an undesirable oxidation reaction end-product. Other benefits of ZVI and ferrous iron with respect to oxidation reactions are discussed elsewhere in this disclosure.

Granular Activated Carbon (GAC) Treatment

Figures 1, 6A:
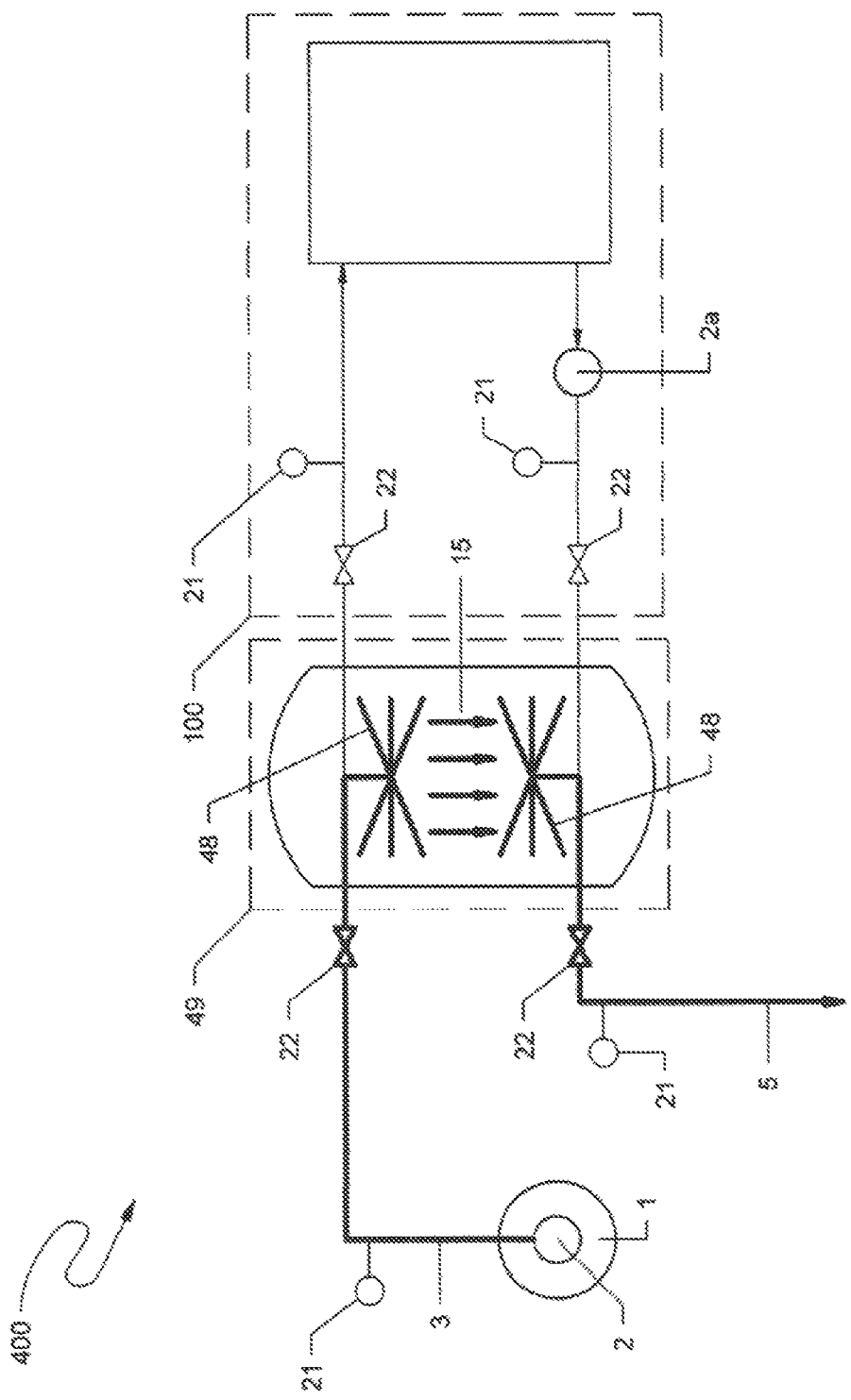
Figures 2, 6A:
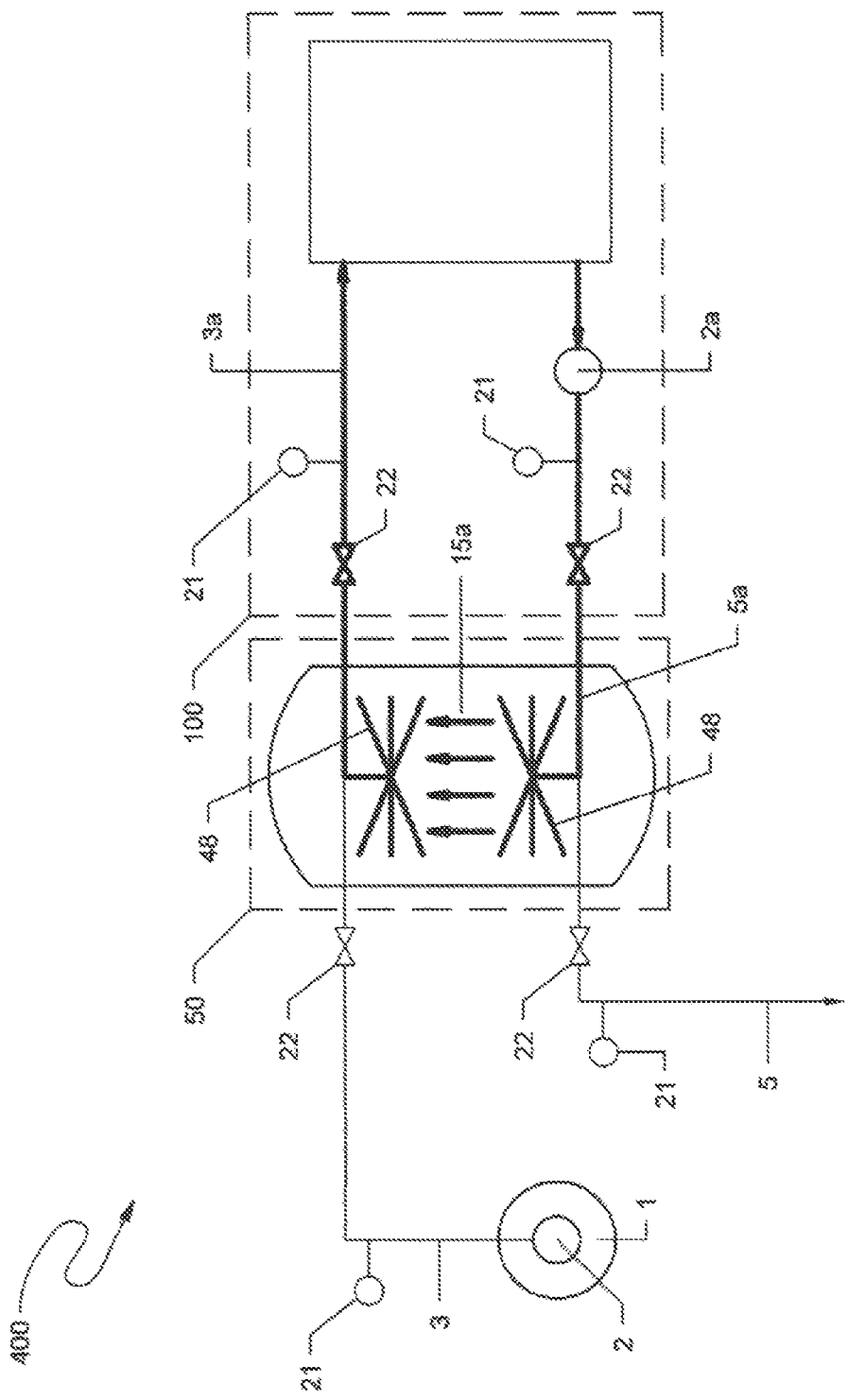

While activated carbon media is a preferred embodiment in this component of the technology as depicted in FIG. 6-series, other media types may also be suitable for treatment in the disclosed equipment.

Figure 6B:
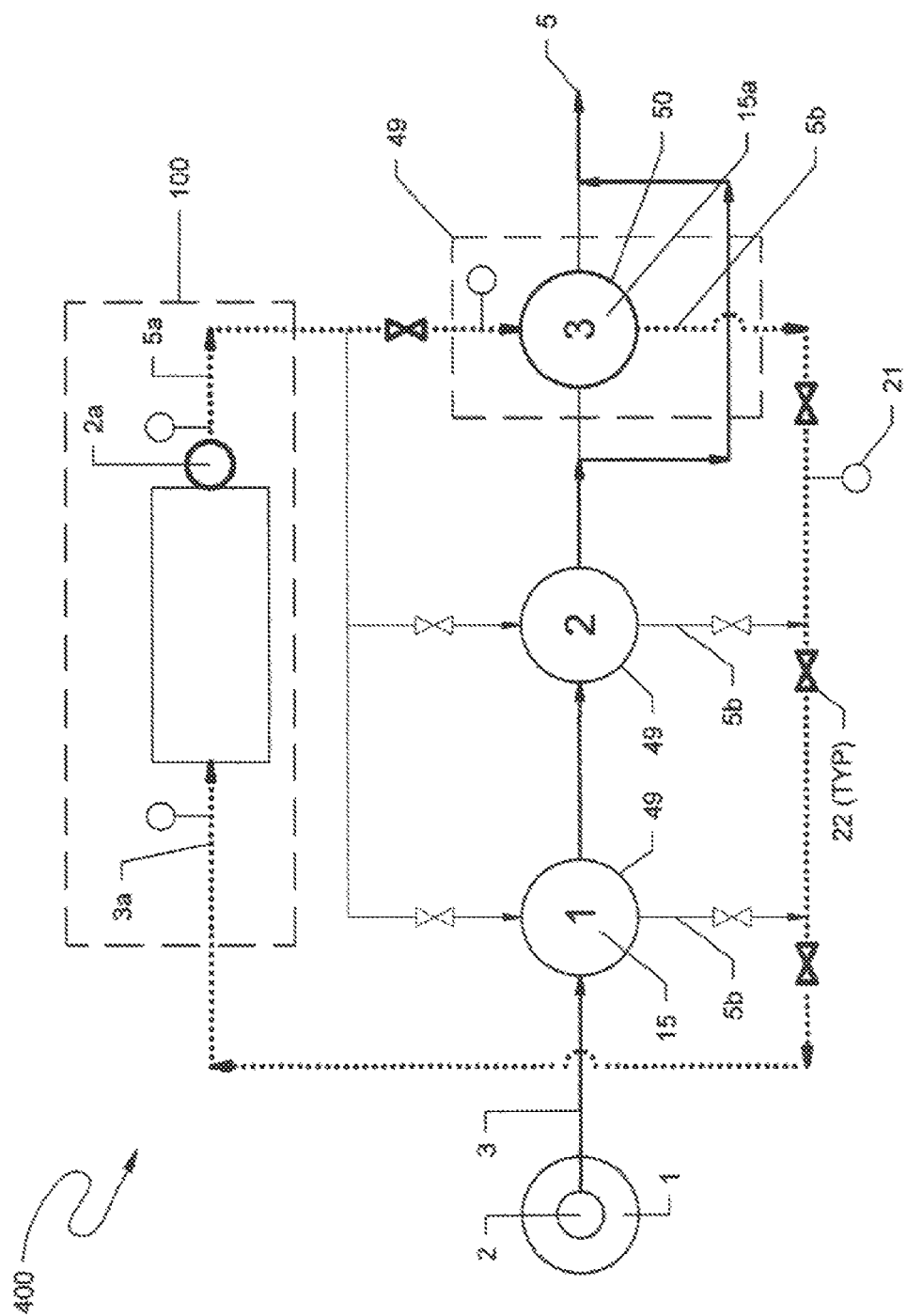
FIG. 6B illustrates an embodiment of the technology described herein, with a plurality of carbon treatment absorbers charged with granular activated carbon in a serial treatment train and in which each absorber and their respective media can be individually removed from water treatment service and singularly processed by the technology described herein.

FIGS. 6A-1 and 6A-2 depict two operational modes of a single granular activated carbon cell as an integral component of the present technology. FIG. 6A-1 depicts a carbon cell in-service and on-line treating water from a contaminated source. FIG. 6A-2 depicts the same carbon cell that is out-of-service and in-treatment for contaminants contained by the spent activated carbon within the cell. FIG. 6B presents an example where the equipment is depicted treating one (1) of three (3) activated carbon cells used to treat contaminated source water by removal of contaminants using media transfer from water to the carbon media, and where any one of the three carbon cells may be treated while either of the other two carbon cells remain on-line treating the water.

Considering both FIGS. 6A-1 and 6A-2, treatment system 100 and adjacent carbon absorbers 49 and 50, and the contaminated water source are all fluidly connected with valves and manifold piping to comprise embodiment 400 where source water 3 is treated by the carbon 15 in the absorber 49, and when spent, the carbon 15a in absorber 50 of FIG. 6A-2 can be treated with system 100. In this embodiment system 400, the carbon cell 49 can be placed in-line for water treatment in 6A-1, or taken off-line from the water source 1 so that the same cell 50 in FIG. 6A-2 can be placed into an in-treatment operation mode by the treatment system 100. As depicted in both Figures, the use of the treatment equipment in system 400 is embodied where the treatment system 100 combines with the carbon cell 49 to form an expanded system 400 and the carbon cell that was in-service 49 in 6A-1 becomes a treatment reactor vessel 50 in 6A-2 for contaminated media 15a in 6A-2 treated by fluid from the treatment system 100 outlet 5a.

FIG. 6A-1 illustrates a contaminated fluid or water source 1 that is transferred by a pump 2 through feed piping 3 into the top of carbon cell 49 that is in-service and on-line to treat water and contains a granular activated carbon media 15 suitable for removing contaminants from the water. The carbon or other media 15 is retained within the absorber cell 49 by means of screened laterals 48. During water treatment, conventional operation is by downflow and the bottom lateral screens 48 retain the carbon media 15 within the absorber cell 49. Water passes through the column bed of carbon media 15 and exits through the lower screens 48 and flows out of the absorber cell 49 to a piping outlet 5 for discharge or subsequent processing.

FIG. 6A-2 illustrates the same configuration as shown in FIG. 6A-1, however, the carbon cell 49 now is removed from in-line service and placed in an in-treatment operation mode. FIG. 6A-2 illustrates the in-treatment mode where carbon cell 50 is no longer in-service or on-line treating water. Valves 22 are changed so that oxidation fluid from the treatment system 100 is transferred by pump 2a into the bottom of the carbon cell 50, through the lower lateral screens 48, up through the column bed of spent carbon media 15a that is retained by the upper lateral screens 48, and the water is returned through piping 5a back to the treatment system 100. In this operational mode, recirculating oxidation fluids between carbon cell 50 and treatment system 100 will not typically require discharge as the fluid will be re-usable, however, a storage tank (not shown) may be part of the system 100 for surplus storage and re-use. During periods where carbon cell 50 is not being treated, the fluid in such a storage tank may be processed without passing through the carbon cell after it is treated until the fluid meets discharge requirements, or it can be stored and reused for treatment of the next carbon cell that is taken out of service and off-line.

Again, referring to FIG. 6A-2, as fluid 5a is pumped via pump 2a up through the spent carbon media 15a in cell 50, the oxidants in the fluid attack the contaminants and organic constituents adsorbed in the media. In addition, the spent media 15a may also be desorbed by fluid 5a and the released/removed constituents will be carried back to the system 100 in fluid 3a for subsequent treatment and processing. The flow rate of fluid 5a up through the absorber 50 and media 15a and back to the oxidation system may equal that of the process operation of the carbon cell 49 during water treatment, however a preferred flow is in the range of 2-20% of the in-service, on-line flow rate. It is also noted that when on-line treating water, carbon cell 49 of FIG. 6A-1 may require periodic backflushing to suspend the carbon bed 15 and facilitate the release and flushing of various solids and residue that may accumulate during water treatment processing production. In such cases, the piping may need to be modified to accommodate this backflush fluid, operating pressure, and solids loading, however, such modification may not be needed depending upon the specific condition and characteristics of a given water source 1 being treated. When solids are present in the source water 1, it is common practice to install other well-proven water treatment system components, such as settling, clarification and/or filtration, that would remove solids and other fines prior to the use of activated carbon polishing of higher quality water characterized by low solids loading, but that still contains oxidizable substances and compounds Process control sensors and monitors 21 should be installed at the feed inlet and outlets of all components of the system 400 to evaluate performance, reaction status, operating conditions, and integrate with general system controls to affect process operating variables and auto-mated controls whether they be pumps, power controllers, and/or the like at locations where such monitoring is desired. An adequate distance between the monitoring location and the nearest tube/pipe geometry change will likely be required based upon monitoring/sensor manufacturer recommendations. Typically, a distance of ten (10) times the radius is adequate. Gas/liquid separation and gas removal valves (not shown) may also be added where gas may collect at various locations in the top of the carbon cell 49/50 and at various other locations where it can accumulate within the system 400. In another embodiment, non-contact tubing coils or heat exchangers can be installed (not shown) within the media bed chamber of the carbon cells 49 and 50 should temperature control benefit treatment.

While FIGS. 6A-1 and 6A-2 illustrations apply to an arrangement of a singular carbon cell 49 and 50 in one preferred embodiment 400, treatment component 100 and carbon cells 49 and 50 can be provided in plurality such that carbon cells 49 are in parallel or in series to each other, and carbon cell 50 can be taken off-line for treatment while the remaining cells 49 remain in service as illustrated in FIG. 6B. Likewise, the oxidation treatment system 100 is also shown in singularity, but it may also be provided in fluid plurality should media 15a in multiple cells 50 require concomitant treatment for a larger com pound-complex carbon system be required.

FIG. 6B illustrates a serial plurality of in-service and online carbon cells 49 and a single in-treatment carbon cell 50. With reference to FIG. 6A-1 and FIG. 6B, carbon cells 49 in FIG. 6B are plumbed in serial plurality with carbon cell 50, however as shown, cells 49 are in-service and on-line treating water 3 through carbon absorbers 49 in a lead-lag configuration with and effluent discharge 5. Cell 50 is off-line and being treated for contaminants without interrupting the water treatment service provide by cells. Treated and oxidation fluid water 5a from the treatment system 100 is pumped 2a up through carbon cell #3 50 and the outlet water 5b is pumped 2a back into the treatment system 100 in a recirculation mode. Once cell 50 has finished its in-treatment operation, it can be put on standby until the lead cell 49 is fully exhausted and spent with contaminants from the source water 1. Cell may then be placed in service as cell 49 in the lag position behind cell 49 which will move to the lead position. Spent cell will be taken off-line and out of service and placed in the position formerly held by cell 50 so that its carbon may be treated. With appropriate piping of the system 400, valves 22, and pipe manifolds (not all shown/numbered), the changes in service of the carbon absorber within the overall system 400 can be made without interrupting the treatment of source water 1. It is noted that not all piping, valves, and manifolds are shown in FIG. 6B, and those that are shown are only included to suggest certain aspects of that piping. Also not shown is that all carbon cells 49 and 50 should be of equivalent design with respect to carbon media lateral screens 48, materials of construction, operating controls, valves 22, piping, and process monitoring devices and instruments 21 as may be required to facilitate efficient and effective treatment. However, if carbon cells are not equivalent, the treatment system 100 may be operated flexibly to accommodate each absorber's uniqueness whether by changing flow rates, flow pressure, power settings, and/or supplemental reagent dosing provided in the treatment system 100.

Concentrates and Brines

Figure 7:
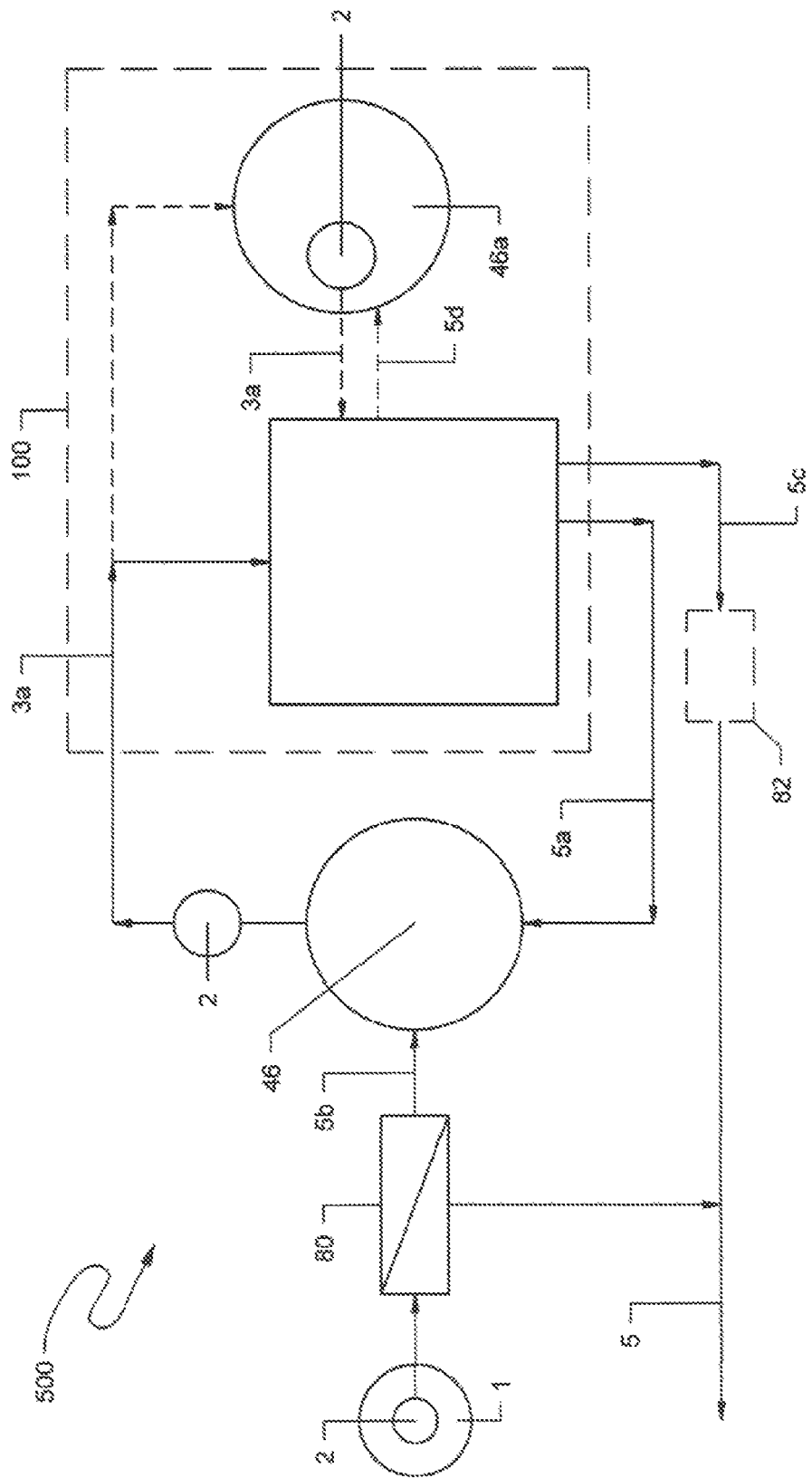
FIG. 7 illustrates an embodiment of the technology described herein configured to treat oxidizable compounds, substances and materials in fluids such as reverse osmosis reject or membrane separation concentrates, extraction or regeneration brines, and other such fluids where treatment using a recirculation operational mode may be required to achieve a desired outcome, and where the oxidizing fluid generated by the technology described herein is used as a supplemental reagent.

FIG. 7 depicts the system 500 when applied to fluids where contaminants are present in concentrated levels. Examples of such fluids 5b include reject from reverse osmosis (as shown) and other such membrane-based separation technologies, fluids derived from the desorption of carbon, brines and well field fluids such as might be generated from various extraction processes, or resin and other media regeneration processes, and the like. Aqueous Film-Forming Foam (AFFF) with suitable dilution is also be treatable with the present technology.

By means of example and in this preferred embodiment 500, the basic system of the technology 100 and the manufacture of a powerful oxidizing fluid 200 (See FIG. 1), are both applied to treat oxidizable contaminants concentrated in reverse osmosis membrane reject concentrate 5b as shown in FIG. 7 as one example. Influent fluid 1 is fed by pump 2 into a reverse osmosis system 80 where membrane separation of contaminants generates a clean membrane permeate for discharge 5, and a contaminant concentrated membrane reject fluid 5b. As depicted, reject 5b is discharged into a storage tank 46 where it collects and the fluid 3a is transferred by pump 2 as volumes reach a pre-determined level in the tank to another storage tank 46a or through inlet piping 3a to the treatment equipment 100. Another pump 2 may feed fluid 3a from tank 46a into the treatment system 100/200 for processing. Treated or partially treated water can be discharged from outlet 5c and/or 5d into either tank 46 or 46a in one of two (2) recirculating treatment loops. Fully treated fluid can be discharged from outlet 5 as treated effluent or to another treatment component 82 of a master system of which this embodiment 500 is a portion thereof, or where another treatment component 82 is a component of the present system 500. In another configuration of the embodiment (not depicted), concentrate fluid 5b to be treated can be directly fed to the treatment system 100 without being stored in tank 46 and/or 46a.

As previously described and shown in other figures, the system 100 may include as few or as many components as necessary to achieve desired treatment performance and water quality outputs. Such components in the system 100 may include: single or a plurality of devices but at minimum include both the hydrodynamic/acoustic cavitation reactor and the electrochemical oxidation cell with supplement reagent or reagent(s) supply as needed. Because of the concentrated nature of the fluid in this embodiment example, the sinusoidal mixing reactor (FIG. 2) may also be necessary to further enhance the formation of oxidants and/or extend their legacy, and facilitate the destruction of recalcitrant contaminants while also ensuring adequate mixing is provided to uniformly distribute water constituents and oxidants within the fluid to achieve process efficiencies and performance with consistent water quality objectives of the treated water outlet effluent 5.

When treated water is discharged via outlet 5d to storage tank 46, this application detail is also an embodiment as depicted in FIG. 1, indicated as 200 where a strong oxidizing fluid is manufactured using feed water 1 and system 100 that also includes supplement reagents delivered to fluid within the treatment system 100. In this configuration of operation, the manufactured oxidizing fluid 5d can be mixed with influent water 2 in either tank 46, or utilized in the system 100 to help treat inlet water 3a that is directly pumped into the treatment system component of 100. As previously discussed, the selection of which supplemental reagents and their respective working strength concentrations and consumption rates will depend on optimization treatability studies where treatment equipment operating variables are evaluated against specific reagents and dose rates that best suit the target constituents in the fluid being treated to achieve the desired outcome are identified.

For extremely elevated contaminants in concentrated fluids, the embodiment shown in FIG. 7 can be used as a batch process where additional processing time and exposure to oxidation conditions is achieved with prolonged and repeated recirculation. Alternatively, the present technology can be applied on an intermediate or blended processing mode using equipment with reduced or expanded production processing capacity using a variety of components in plurality with appropriate component scaling.

Leachates and Complex Fluids

Figure 8:
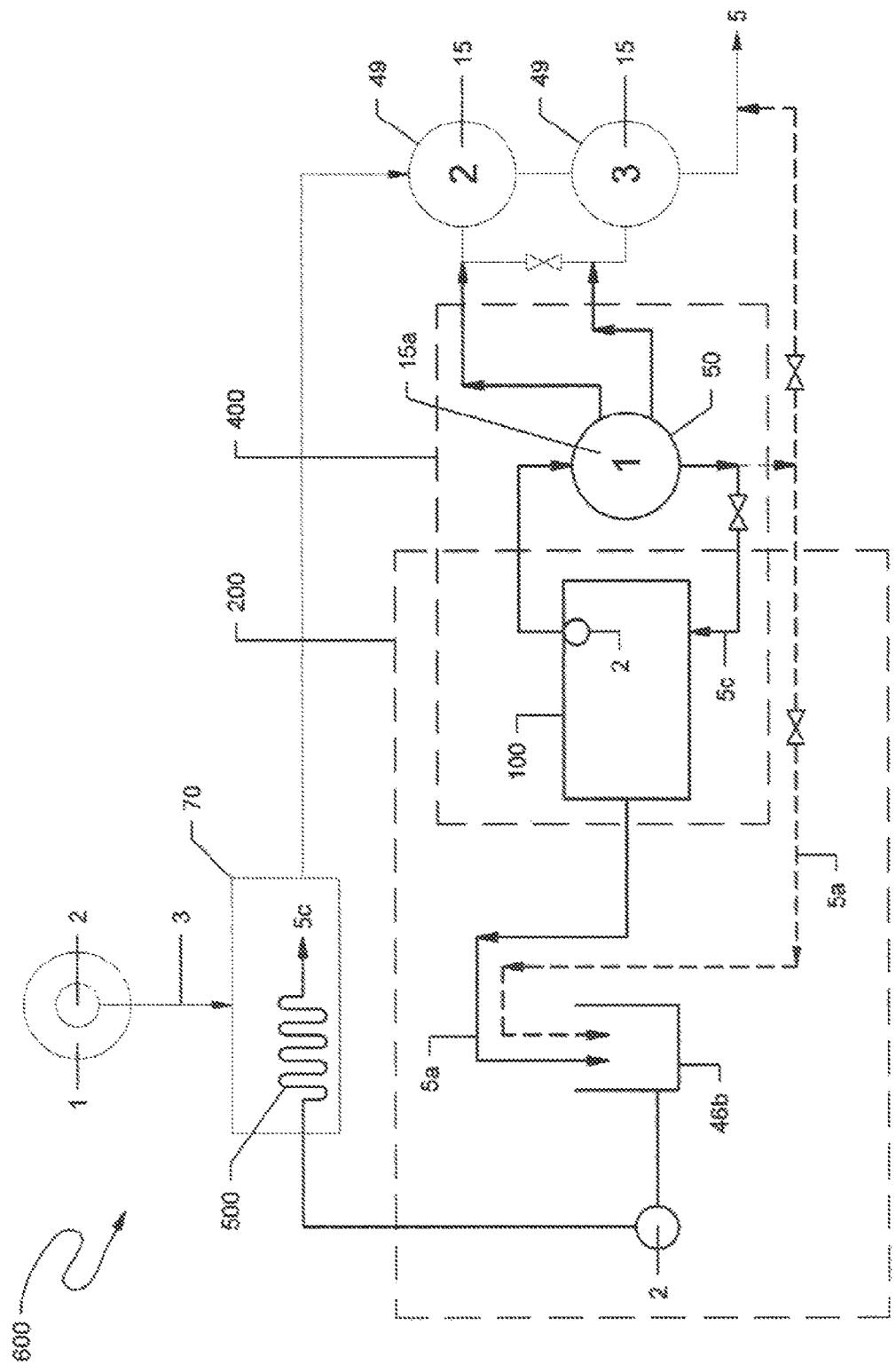
FIG. 8 illustrates an embodiment of the technology described herein that can be included as a component of a larger treatment system and that can treat landfill leachate and other complex fluids requiring additional treatment process steps supplemental to substance oxidation or other benefits.

FIG. 8 presents yet another embodied application of the present system 600 where oxidizable contaminants, including PFAS and other organic compounds and substances carried in fluid such as landfill leachate, mine ore leaching fluids, well field hydrofracturing production and flowback fluids, and other such streams are present.

Fluid inlet water 1 is transferred by pump 2 through piping 3 to a water treatment system 70 that may be primary to system 100 as shown, or where the present system is primary to the ancillary system 70. Water treated by the system 70 is shown in the present FIG. 8 example as being polished by activated carbon media 15 in absorbers 49 to remove organic compounds and substances and achieve suitable discharge water quality criteria. A granular activated carbon treatment train of three (3) absorbers 49 and 50 where absorbers 49 are in-service and on-line treating the water from treatment system 70. Absorber 50 is out-of-service and off-line from treating water from system 70 and is configured to treat contaminants it removed from the water in system 400 by the treatment process 100. Prior to being taken off-line, absorber 50 was on-line in a previous lead-cell capacity. When absorber 50 was removed for treatment in system, absorbers 49 were moved ahead into the respective lead and lag serial absorber positions to continue treatment of water from the system 70.

Absorber 50 is connected to the treatment system 100 as depicted in FIG. 6A-2 where oxidizing fluid 3a is fed to Absorber 50 on an up-flow basis through the spent carbon 15a, counter to the down-flow operation in absorbers 49 that are in-service and on-line to treat water. In an up-flow operation mode, oxidants from the system 100 enter the carbon bed 15a from the bottom and slowly move up through the bed to oxidize organic substances and compounds, flush desorbed organic substances with the flow, and facilitate the movement of process reaction gases with the flow to separation/removal portals 42 (for example, See FIG. 2). Fluid 5c discharged from the top of the carbon bed 15a and absorber 50 also may carry desorbed contaminants and oxidation intermediary by-products back to the treatment system 100. Within, additional oxidants and hydroxyl and ionic radicals will be generated and attack contaminants and their intermediaries that are released from or otherwise generated by the oxidizing fluid while passing up through the carbon media bed. The fluid discharged from the treatment system 100 may be refed to Absorber 50 at the bottom and up through the carbon bed 15a in a recirculation processing mode of operation. Concurrently, or in a different operation mode, treated water 5a from system 100 can be captured if of adequate quality and it contains a suitable level of oxidants with an elevated cumulative oxidation potential, and may be transferred to a tank 46b for use an oxidizing reagent in the primary system 70. FIG. 8 also depicts a sinusoidal mixing reactor 500 where the oxidizing fluid 5a can be introduced, blended, and reacted with the water and/or reintroduced into water 5c being treated by system 70. Use of the sinusoidal mixing reactor 500 will enhance and prolong oxidant latency and facilitate oxidant interaction with oxidizable substances and materials carried by the inlet water 2.

As embodied in FIG. 7, FIG. 8 also embodies the manufacture of a powerful oxidizing fluid, recirculation, but adds the embodiment depicted in FIGS. 6A and 6B where a media within its retention absorber is treated in a combined application to oxidize and destroy organic compounds and substances. Mutual benefits of FIG. 8 include the manufacture of an oxidizing reagent that can be used within the primary treatment system as well as generating a carbon media that can be put back in-service and on-line to treat water from the primary water treatment system 70, thus extending the life the media by adding use cycles. Should treated carbon media not be re-serviceable, its contained contaminants will be destroyed to adequate concentrations to allow for the media to go into the landfill cell without risk of its release of contaminants to the leachate of the landfill over time.

Another application of the embodiment of this disclosure as depicted in FIG. 8 is the processing of hydrofracturing produced and backflow waters. Such water processed by the system shown in FIG. 8 will remove contaminants and constituents that are problematic to frac fluid makeup and deep well injection disposal, or better, allow for its reuse in the well field. Treatment of oxidizable substances and organic compounds such as burnt polymer, hydrocarbons, surfactants, paraffins, stable emulsions, and contributors to Total Organic Carbon concentrations by system 400/200, with various solids and fines removed by secondary system 70 in a secondary position following the system 400/200 will facilitate the management of such treated water by minimizing the pressure needed for deep well injection disposal. Further, removal and treatment of these constituents and characteristics of spent frac water will prolong the viability and porosity of the formation receiving the injected water.

Media Reactor

Figure 9A:
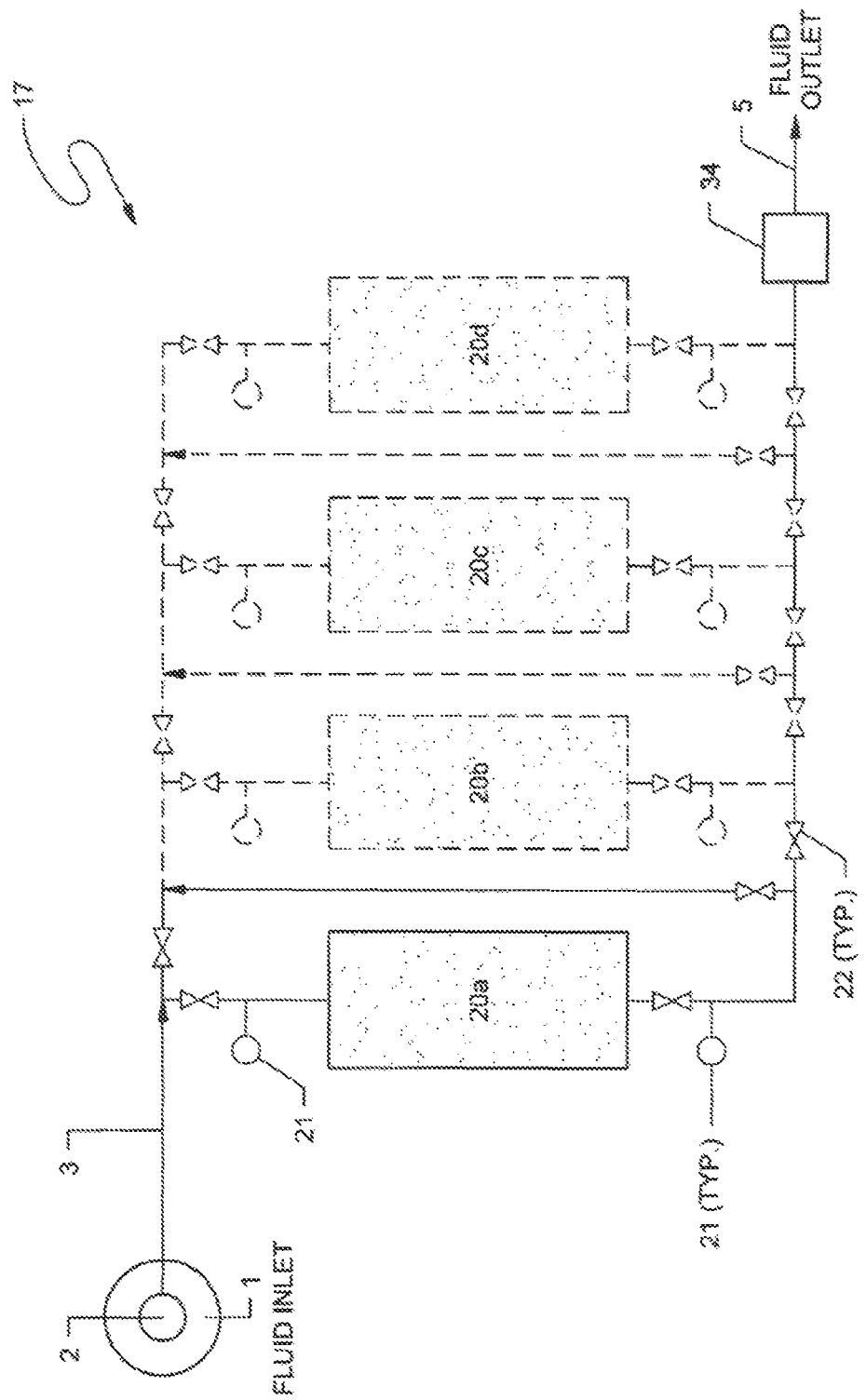
FIG. 9A illustrates a passive media reactor device that can be incorporated into embodiments of the technology described herein.
Figure 9B:
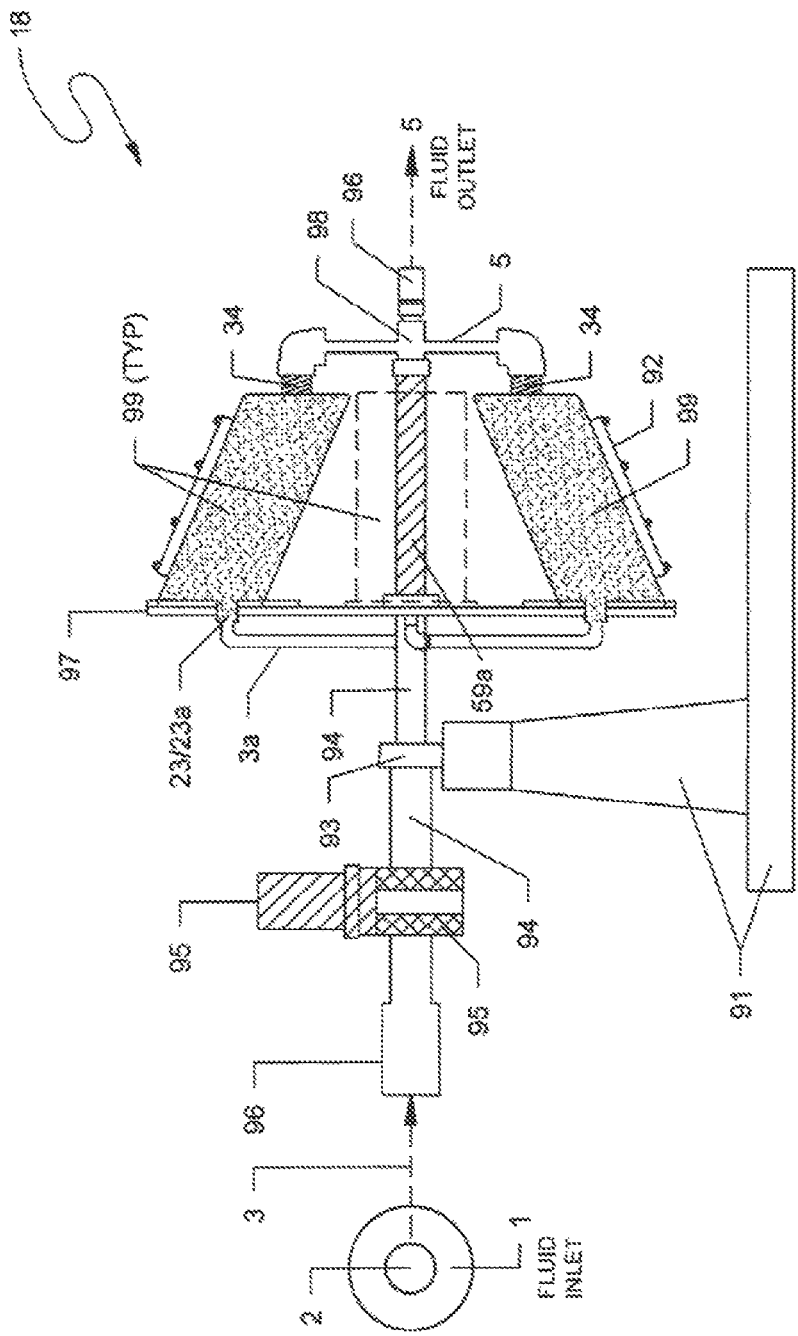
FIG. 9B illustrates a tri-axial single-plate mixing reactor that can be incorporated into embodiments of the technology described herein.
Figure 9C:
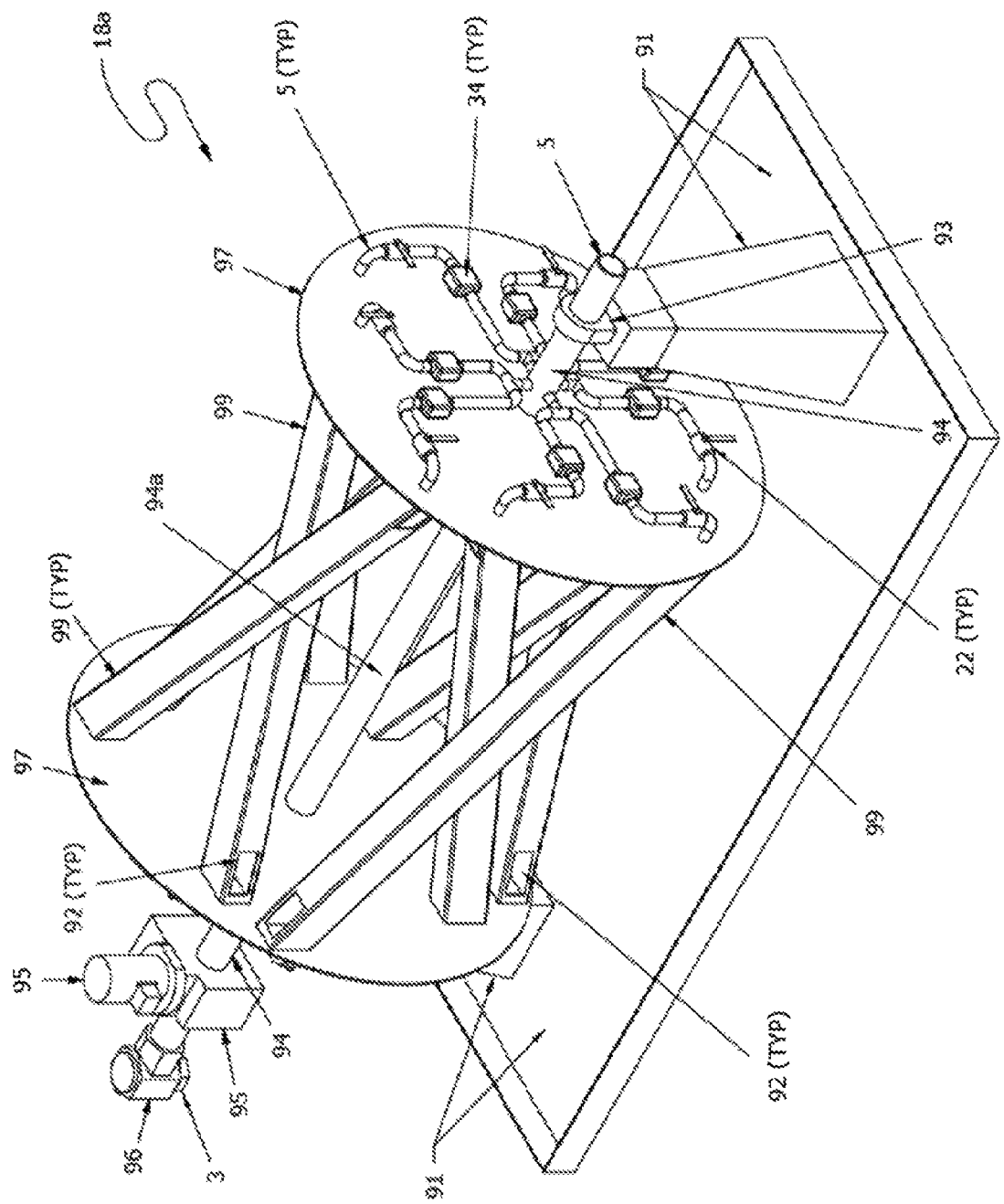
FIG. 9C illustrates a dual-plate tri-axial mixing reactor suitable for large flows or those that require prolonged contact with reactive media within mixer chambers that can be incorporated into embodiments of the technology described herein.

FIGS. 9A-9C depict passive, single plate, and dual plate media contact reactors, respectively that can be integrated with the present technology to facilitate oxidant generation and oxidation of contaminants and other substances and compounds. When inserted into the system illustrated in FIG. 1, or others such as FIG. 8 and a suitable media is utilized, such as zero valent iron, the present technology will have added capacity to treat recalcitrant contaminants and stable complex water and fluids. Examples of such fluids include landfill leachate and acidic mine fluids. Both fluids may contain elevated levels of PFAS as discussed elsewhere in this disclosure, but also acidity in the form of acetic acid in the former, and sulfuric acid in the latter and the use of the media reactor will facilitate treatment of acidity using ZVI, but also recalcitrant organic substances.

While 9A represents single non-moving static flow-through media reactor in plurality, FIG. 9B presents a single plate tri-axial revolving reactor for smaller flows and 9C depicts a dual plate triaxial revolving reactor for large flow, all with multiple media contact chambers. As previously mentioned, the media reactor in FIG. 9-series can be inserted within the present system before or after various components, but also substitute for the sinusoidal mixer detailed in FIG. 2 as well as other embodiments previously discussed and depicted.

With reference now to FIGS. 9A, 9B, and 9C, additional detail on the media reactors suitable for use in the systems disclosed herein is provided. FIG. 9A illustrates one style of a stationary flow-through media chamber 20 in singularity (20a, 20b, 20c, and 20d in plurality) suitable for use in the water treatment systems described herein. FIGS. 9B and 9C illustrate various styles of reactive moving media chambers 99 suitable for use in the water treatment systems described herein. Each of these device examples provide for the housing of a selectable reactive media and its intimate contact with water to affect treatment for various constituents hosted by the source water. In either configuration depicted in FIG. 9A, water flows through stationary granular media mass contained within a column, tank, vault, bed, trench, or similar flow-through housing device that allows intimate contact with the media and the aqueous fluid. FIGS. 9B and 9C depict two separate embodiments of a reactive moving media chamber 99 (i.e., mechanically active mixing contact media reactor) where the operational movement of the housing and its contained media facilitates enhanced contact and reaction between water, its constituents, and the media to achieve desired outcomes. In the moving media reactor examples shown in FIGS. 9B and 9C, flow-through tri-axial tumblers are presented. The tri-axial tumblers of FIGS. 9B and 9C may be similar or identical to the tri-axial tumblers discussed in greater detail in U.S. Non-Provisional patent application Ser. No. 16/167,347 (pending), the entirety of which is hereby incorporated by reference. The discussion and descriptions related to FIGS. 9B and 9C provided herein are general summaries and should not be treated as limiting when compared to the more detailed descriptions provided in U.S. Non-Provisional patent application Ser. No. 16/167,347.

Other media reactors of different design and/or geometry from what is shown in FIGS. 9A, 9B, and 9C may be also be used in the system described herein, provided that such other media reactors (whether stationary or moving) enhance media interaction with aqueous fluid and its constituents as sourced, provide catalytic or reactive supplements, and/or enhance oxidation performance and outcomes.

As illustrated in FIG. 9A, a single flow through reactor 20a provides for the contact of water and the contained reactive media in a stationary bed or column. Additional reactors 20b, 20c, 20d, etc. including, e.g., tanks, vessels, beds, trenches, columns, or the like, can be provided in a parallel configuration to expand treatment capacity and performance that may be needed for any given water. FIG. 9A shows piping options to allow for both parallel and serial reactor configurations.

With reference to FIG. 9A, source water 1 is pumped via pump 2 (or delivered under pressure from an upstream component) and delivered via inlet piping 3 to a series of flow through reactors 20a, 20b, 20c, 20d. A manifold system can be provided, together with one or more valves 22 to control flow, in order to distribute water to each of the flow through reactors 20a, 20b, 20c, 20d. As part of an overall stationary media chamber 20, process monitoring and control instrumentation, equipment, and sampling port conventions 21 are can be provided prior to and after each flow through reactor 20a, 20b, 20c, 20d. To retain and/or capture media for its further contribution to treatment, and/or to prevent downstream fouling, downstream capture components 34 (e.g., magnets, screens, in-line baskets, knock-out pots, or the like) can also be used in the disclosed system. In addition to providing extractive functions to the treatment of aqueous fluids, these capture/retention components 34 may also be used hold, retain, and position a granular or other solid catalyst that facilitates process reactions in a flow-through in-line manner. As such, they may be re-located and/or installed at various locations through-out the device to enhance process performance and outcomes. Media within the capture/retention device 34, may include magnets that can enhance treatment performance by removing and retaining various small particles of, for example, zero-valent iron (ZVI) or other magnetic reaction residuals (magnetite). Further, magnetic fields have the potential to facilitate reaction chemistry via possible excitement of reactants and/or alignment of polar molecules in solution. A catalyst such as platinum may also be utilized to enhance reaction rates and overall treatment efficiency. These functional media capture/retention devices 34 can be installed as needed and appropriate within or between the components of the described technology.

Processed water leaves the flow through reactors 20a, 20b, 20c, 20d, via fluid outlet 5 for subsequent processing by system components, management, or discharge as monitored and controlled via process monitoring and control instrumentation (not shown on combined flow outlet).

FIGS. 9B and 9C illustrate various embodiments of reactive moving media chambers 99 suitable for use in the system described herein and which are described in additional detail in U.S. Non-Provisional patent application Ser. No. 16/167,347. FIG. 9B depicts a single-plate reactive moving chambers 99 and FIG. 2C depicts a dual-plate reactive moving chambers 99 with purposeful provisions to accommodate increased flow rates, reaction and/or mixing retention time. Both devices impart robust dynamic tri-axial mixing of media material with fluids that are passed through the unit. In general, these units include a singular or plurality of media mixing reaction chambers fixed obliquely to a rotating end-plate 97 or end-plates 97 such that upon rotation of the plates 97, the chambers 99 revolve around a central spindle 94 causing end-to-end oscillations off the level horizontal rotating centerline of the devices. This imparted end-to-end oscillation couples with the polygonal cross-section of each chamber that causes further movement of the media within fluid flow due to gravity and the moving fall-line slope of the contained granular media as the chamber 99 revolves 360° about the central spindle 97. While tumbling, water is feed 3 into one end of the unit, passes through the actively moving media with intimate contact, and is then released from the other end. The rate of rotation of the spindle 97 and end-plates 97, the amount of media, feed water flow rate, and the overall dimensional design geometry can be designed to accommodate processing and desired treatment results of this component and effects of entire treatment provided by the disclosed system.

With respect to both FIG. 9B and FIG. 9C, source water 1 is pumped via pump 2 (not shown in 9C) or otherwise delivered into the piping inlet 3 fixed to a hydraulic swivel 96. The swivel 96 allows for a water-tight connection between the inlet piping 3 to a rotating hollow spindle 94 that extends through a drive motor/transfer case 95. The motor/transfer case 95 causes rotation of the spindle 94 which is supported by a bearing or bearings 93 mounted to a pedestal or pedestals 92 within the footprint of a suitable base 91. The end of the hollow spindle 94 opposite the swivel 96 is fixed to the center point of the end-plate(s) 97 that rotate with the spindle 94 around the common horizontal axis. The hollow spindle 94 also provides for a flow splitting hub 98 or flow fitting attachment to inlet pipe or tubing 3 to cavitation 23/23a (See FIGS. 4/4a) that feed directly into individual flow-through reactors 99. In some embodiments and due to the intensity of the robust action of the flow through reactors 99, cavitation nozzles 23/23a can be optional where they would otherwise be focused on media that also becomes a target (See FIG. 5-series—not shown in FIG. 9-series) contained within the reactors 20 and 99.

The flow through reactors 99 are obliquely mounted to the end-plate or plates 97 and preferably have rectangular cross-sections. Positioning of the reactors 99 provides preferred structural strength and important balance of the unit during operation as the spindle 94 and plates 97 rotate and the affixed reactors 99 revolve around the common longitudinal axis. Physical balance and alignment is important to reduce energy required to rotate and operate the unit, and for its overall life-cycle longevity. Flow through reactors 18 and 18a release water via outlet piping 5 and a capture/retention component 34 prior to flowing into a fluid convergence fitting (not labeled), another swivel 96 (not shown on FIG. 9C), then to the fluid outlet 5. In the dual-plate unit in FIG. 9C, a solid-core spindle rod 94a is provided for structural stability of the unit, although a strong hollow spindle 94 may also be utilized with appropriate valve control if water flow through the device without passing through the reactors 99 is desirable. The capture component 34 may be optional, and/or alternatively positioned on or after the singular device outlet 5. A media service port 92 is present on each active flow through reactor 99 to allow for inspection, unit cleaning, and media servicing.

These active interactions not only facilitate media surface area reaction with contaminants and constituents in the fluid, but also provides for physical erosive scouring and cleaning of the media granules' surfaces to prevent or minimize fouling of reactive media. With the tumbling of media and the flow through the media, any solid fines that are generated will be flushed from the active media beds and the chambers with the water flow. Unlike the passive media reactor 17 shown in plurality in FIG. 9A where backflushing and agitation via flow velocity changes and/or the injection of air or an inert gas may be required to breakup and disrupt the passive media bed, the tri-axial mixers shown in FIGS. 9B and 9C will require less frequent monitoring and service maintenance, and enhance treatment efficacy and efficiency of treatment desired by the media. Selection of media material type, and its angularity, hardness, density, and particle size characteristics are examples of variables that can be optimized during treatability studies.

Similar to potential use of target plates illustrated in FIG. 5-series, the reaction chambers shown in FIG. 9-series can provide comparable results when similar materials are used, such as iron, copper, or aluminum, etc., but in granular, pellet, flake or other mobile granular forms vs. the plate material of the cavitation/ECO reactor, when more robust conditions and results are desired. To further replicate performance of the media reactor, cavitation nozzles 23 and 23a of FIG. 5B can be added to the feed line 3a of chambers 99 as shown on FIG. 9B as disclosed above, to provide cavitation erosion and corrosion when small or nanoparticles or corroded species of the metal (such as iron or copper ions) are desired to enter the flow of fluid being treated for reaction and performance enhancement purposes.

Process control sensors and monitors 21 as indicated in all Figures should be installed at the feed inlet and outlets of all components of the systems illustrated in this disclosure as well as where may be appropriate between inlet and outlets of components where additional monitoring may be desired, for example before or after optional components of the sinusoidal mixing reactor in FIG. 2. These control points allow for the installation of sensors, gauges, indicators, monitors, sample taps, and the like to evaluate performance, reaction status, operating conditions, and integrate with general system controls to affect process operating variables and auto-mated controls whether they be pumps, power controllers, and/or valve adjustments, etc. An adequate distance between the control points of monitoring location and the nearest tube/pipe geometry change will likely be required based upon monitoring/sensor manufacturer recommendations. Typically, a distance of ten (10) times the radius is adequate.

With respect to data gathering from these process sampling and monitoring control points, any commercial analogue or digital system is suitable provided it is able to generate outputs and integrate as necessary to properly control the system and as may be desired whether for manual, partially or fully automated control.

Gas/liquid separation and gas removal valves shown throughout the Figures may also be added at any location where gas may collect within enclosed system components. Management of gases, typically carbon dioxide, but also hydrogen and oxygen, separated from fluid may require additional equipment and methods to capture and control emissions to the atmosphere.

Due to the extremely harsh chemical oxidation characteristics and conditions created by the present technology, stainless steel is a preferred material of construction for all components and systems of the present technology. However, engineers and designers may appropriately specify materials of construction or coatings that are less stable than a high grade stainless steel, provided such material or coating is able to withstand the intensity and strength of oxidants needed to destroy the oxidizable substances and compounds capable of being treated over the desired life-cycle of the equipment components. While Teflon, PTFE, Kynar, and/or other such materials are typically suitable for use, they can be contributors to PFAS telomere presence and cross-contamination sources when extremely low levels of PFAS at the ng/L (ppt) levels, for example, are a desired output.

EXAMPLES

Example 1 with each at 100% modulation. Regime A was processed at 250 W of power and for Regime B, power was increased to 500 W per opposing transducer pairs, again with both at 100% modulation. The flow rate for each run was set at 1.5 gpm, and all samples were all treated for 30 minutes in a recirculation loop. Configurations A and B demonstrated that ultrasound alone did not significantly destroy PFAS, but that increased acoustic energy slightly enhanced performance. Regime B produced a reduction in total PFAS

TABLE 2

PFAS Viability Groundwater Treatment Study I

| | | Sample ID | | | | | | | |
|---|---|---|---|---|---|---|---|---|---|
| | | Untreated | Configuration A | | Configuration B | | Regime A | | Regime B | |
| Perfluorinated Compounds | Acronym | ug/L | ug/L | % Change | ug/L | % Change | ug/L | % Change | ug/L | % Change |
| Perfluorooctanesulfonic acid | PFOS | 300 | 249 | −17.0% | 347 | 15.67% | 152 | −49.3% | 25.9 | −91.4% |
| Perfluorooctanoic Acid | PFOA | 100 | 86.8 | −13.2% | 84.5 | −15.50% | 42.1 | −57.9% | 18.0 | −82.0% |
| Perfluorononanoic Acid | PFNA | <1.6 | <2 | — | <2 | — | <0.4 | — | <0.2 | — |
| Perfluorohexanesulfonic acid | PFHXS | 4.20 | 4.35 | 3.6% | 4.43 | 5.48% | 7.46 | 77.6% | 1.89 | −55.0% |
| Perfluoroheptanoic acid | PFHPA | 7.30 | 5.85 | −19.9% | 5.32 | −27.12% | 6.26 | −14.2% | 4.14 | −43.3% |
| Perfluorobutanesulfonic acid | PFBS | <1.6 | <9 | — | <9 | — | 2.89 | — | 0.574 | — |
| PFAS - SUM | | 411.50 | 346.00 | −15.9% | 441.25 | 7.23% | 210.71 | −48.8% | 50.50 | −87.7% |

Table 2 presents yet another example of the capabilities of the technology described herein. In this study, groundwater from a former tannery site impacted with Polyfluoroalkyl substance (PFAS) telomeres was treated using a laboratory bench scale treatment system. 5 gallons buckets of impacted groundwater were processed in each treatment run using by the technology disclosed herein. The treatment equipment for all four (4) treatment runs were configured as illustrated in FIG. 1A, but without either sinusoidal mixer 300 or the first electrochemical cell chamber 19. No supplemental reagents were utilized. Configurations A and B included only the ultrasound unit and did not include the cavitation nozzle or the electrochemical oxidation cell. Regime A and B were replicated with hydrodynamic nozzles, ultrasound, and the electrochemical oxidation cell, but both the feed pressure to the cavitation nozzle and power to the electrochemical oxidation was increased by 30% for both components in Regime B. Configurations A and B were processed with ultrasound using two 40 kHz and two 68 kHz transducers as opposing pairs, but with 500 W of power applied to Configuration A and 250 W of power in Configuration B telomere concentration by ~49%, whereas Regime B demonstrated that over 87% of the identified PFAS telomeres as a cumulative total were destroyed. The data demonstrates that use of both forms of cavitation, the BDD electrochemical oxidation cell, and increased water pressure and power to the system enhanced PFAS destruction performance without supplemental reagents.

Example 2

TABLE 3

PFAS Viability Groundwater Treatment Study II

| | | Sample ID | | | | | | | |
|---|---|---|---|---|---|---|---|---|---|
| | | Untreated | Regime C | | System Blank | Regime C.1 | | Regime C.1 Adjusted for Sys Blank | |
| Perfluorinated Compounds | Acronym | ug/L | ug/L | % Change | ug/L | ug/L | % Change | ug/L | % Change |
| Perfluorooctanesulfonic acid | PFOS | 300 | 9.18 | −96.9% | 0.58 | 3.26 | −98.9% | 2.68 | −99.1% |
| Perfluorooctanoic Acid | PFOA | 100 | 12.3 | −87.7% | 0.244 | 2.54 | −97.5% | 2.30 | −97.7% |
| Perfluorononanoic Acid | PFNA | <1.6 | <0.2 | — | <0.1 | <0.2 | — | <0.2 | — |
| Perfluorohexanesulfonic acid | PFHXS | 4.20 | 0.678 | −83.9% | <0.15 | <0.3 | — | — | — |
| Perfluoroheptanoic acid | PFHPA | 7.30 | 3.00 | −58.9% | 0.0665 | 1.11 | −84.8% | 1.044 | −85.7% |
| Perfluorobutanesulfonic acid | PFBS | <1.6 | <0.9 | — | <0.45 | <0.9 | — | — | — |
| PFAS - SUM | | 411.50 | 25.16 | −93.9% | 0.8905 | 6.91 | −98.3% | 6.0195 | −98.5% |

Table 3 presents yet another example of the capabilities of the technology described herein. In this study, groundwater from a former tannery site impacted with Polyfluoroalkyl substance (PFAS) telomeres was treated using a laboratory bench scale treatment system 45 days after Example 1 after receipt of Example 1 analytical data. 5 gallons buckets of the same impacted groundwater were processed in each treatment run using by the technology disclosed herein. The treatment equipment for the two (2) treatment runs were configured as illustrated in FIG. 1A, but without either sinusoidal mixer 300 or the first electrochemical cell chamber 19. Although the system was decontaminated between runs, and system blank was collected from the equipment's final rinse of distilled water after Regime C. Regime C and C.1 were processed using 10% less water pressure and electric power electro chemical oxidation cell than was applied Regime B in Example 1. A 1:1 blend of 35% hydrogen peroxide and a 10% solution of sodium sulfate was prepared as a supplemental reagent. 25 ml of this solution was added to C-1 and mixed manually into the untreated bucket, and 50 ml was added to. C.1 and similarly mixed. Each water was processed at 1.5 gpm for 30 minutes. Data for C.1 was adjusted for PFAS found in the blank. Both Regimes C and C.1 showed enhanced performance over the study in Example 1, demonstrating that the supplemental reagent was beneficial to performance despite a reduction in water pressure to the cavitation nozzles and the BDD electrochemical cell. Further, the data demonstrates that the process can be easily adjusted to optimize favorably impact PFAS destruction in groundwater. It also demonstrates the difficulty in cleaning equipment of residual PFAS.

Example 3 reject fluid. Approximately 20 gallons of groundwater was processed with a bench-scale RO test unit without the use of a membrane anti-scalent agent to obtain 5 gallons of reject fluid for subsequent PFAS treatment by the present technology. Samples of both an equipment/membrane blank, and the treated RO permeate were collected and analyzed for PFAS. The RO reject was then processed by the treatment process disclosed herein to evaluate efficacy of PFAS in a concentrated fluid. RO concentrate was processed using the same equipment, methods, supplemental reagent and dosing, flow rate, and treatment time as that applied in Regime C of Example 2, however 50% of the supplemental reagent was added prior to treatment, and 50% was added at T=15 minutes into the treatment run. Power to the electrochemical oxidation was adjusted to the same current density used in Regime C to accommodate the increased conductivity of the groundwater RO concentrate. The data demonstrates that the disclosed technology can effectively treat a concentrated membrane reject fluid. While optimization is needed to improve treatment efficacy, increased PFAS concentration by a factor of ~1.5 in untreated water still resulted in a decrease in PFAS concentration by over 80% using a similar treatment regime on water that was not concentrated. The addition of supplemental reagent over the course of the treatment contributed to the results as oxidants exhausted early during treatment were replenished during processing. The increased conductivity of the fluid allowed for a reduc-

TABLE 4

PFAS Viability Groundwater Reverse Osmosis Treatment Study III

| | | | | | | | | Present Technoloy | |
|---|---|---|---|---|---|---|---|---|---|
| | | | Lab Water RO | Untreated | Untreated GW | | | Treated RO Reject | |
| | | Untreated | Membrane | GW RO | RO Reject | RO Conc | | Concentrate | |
| | | Groundwater | Equipment Blank | Permeate | Concentrate | Factor | | | |
| Perfluorinated Compounds | Acronym | ug/L | ug/L | ug/L | ug/L | X Untrt'd | | ug/L | % Reduction |
| Perfluorooctanesulfonic acid | PFOS | 300 | <0.04 | 0.0121 | 468 | 1.56 | | 57 | 87.9% |
| Perfluorooctanoic Acid | PFOA | 100 | <0.02 | 0.0600 | 133 | 1.33 | | 50 | 62.8% |
| Perfluorononanoic Acid | PFNA | <1.6 | <0.02 | <0.02 | 0.427 | — | | <0.01 | >97.7% |
| Perfluorohexanesulfonic acid | PFHXS | 4.20 | <0.03 | <0.03 | 9.17 | 2.18 | | 1.51 | 83.5% |
| Perfluoroheptanoic acid | PFHPA | 7.30 | <0.01 | <0.01 | 13.4 | 1.84 | | 12.6 | 6.0% |
| Perfluorobutanesulfonic acid | PFBS | <1.6 | <0.09 | <0.09 | 6.95 | — | | <4.5 | >35.3% |
| PFAS - SUM | | 411.5 | — | 0.0721 | 630.9 | ~1.5X | | 120.3 | >80.9% |

Table 4 presents yet another example of the capabilities of the technology described herein. In this study, the same groundwater from the former tannery site impacted with Polyfluoroalkyl substance (PFAS) telomeres used in Examples 1 and 2 was first treated by reverse osmosis (RO) to obtain fluid with concentrated PFAS from the membrane tion in power applied to the electrochemical cell to run the test at the same BDD electrode current density as in Regime C of Example 2, further showing of power the ability and need to control the process to treat PFAS in a fluid.

Example 4

TABLE 5

PFAS Treatability Study - Plating Facility Wash/Rinse Fluid

| PFAS Telomere | Acronym | Fluorinated C Atoms | Units | Untreated | P-1 | P-2 | P-3 |
|---|---|---|---|---|---|---|---|
| Perfluorohexanoic acid | PFHXA | $C_6$ | ng/L | 514 | 681 | 544 | 8.46 |
| Perfluoroheptanoic acid | PFHpA | $C_7$ | ng/L | 233 | 283 | 254 | 4.09 |
| Perfluorooctanoic acid | PFOA | $C_8$ | ng/L | <9.3 | <19 | 18.8 | 1.01 J |
| Perfluorononanoic acid | PFNA | $C_9$ | ng/L | <9.3 | <0.93 | <1.0 | <1.0 |
| Perfluorodecanoic acid | PFDA | $C_{10}$ | ng/L | <9.3 | <0.93 | <20 | <1.0 |
| Perfluoroundecanoic acid | PFUnA | $C_{11}$ | ng/L | <9.3 | <0.93 | <20 | <1.0 |
| Perfluorododecanoic acid | PFDOA | $C_{12}$ | ng/L | <1.4 | <1.4 | <30 | <1.5 |

TABLE 5-continued

PFAS Treatability Study - Plating Facility Wash/Rinse Fluid

| PFAS Telomere | Acronym | Fluorinated C Atoms | Units | Untreated | P-1 | P-2 | P-3 |
|---|---|---|---|---|---|---|---|
| Perfluorotridecanoic acid | PFTriA | $C_{13}$ | ng/L | <9.3 | <0.93 | <1.0 | <1.0 |
| Perfluorotetradecanoic acid | PFTeA | $C_{14}$ | ng/L | <9.3 | <0.93 | <1.0 | <1.0 |
| Perfluorobutanesulfonic acid | PFBA | $C_4$ | ng/L | 55.6 | 3.26 J | 2.53 J | <1.0 |
| Perfluorohexanesulfonic acid | PFHxS | $C_6$ | ng/L | <9.3 | 27.9 | 4.29 | <1.0 |
| Perfluorooctanesulfonic acid | PFOS | $C_8$ | ng/L | 1370 | 305 | 171 | 40 |
| MeFOSAA | MeFOSAA | $C_{11}$ | ng/L | <37 | <3.7 | <80 | <4.0 |
| EtFOSAA | EtFOSAA | $C_{10}$ | ng/L | <37 | <3.7 | <80 | <4.0 |
| PFAS SUM TOTALS | | | ng/L | 2172.6 | 1296.9 | 992.1 | 52.55 |

A treatability study using the disclosed technology on a plating wastewater from the point of a pretreatment permitted discharge of a midwestern electroplating facility to the sanitary sewer system of publicly owned treatment works (POTW) sanitary. Table 5 presents that date from the study for Example 4. Each treatment run study was performed on 2.5-gallon aliquot samples of a grab sample obtained from the facility. The present technology was applied to each sample, respectively, using a bench-scale treatment system configured in accordance with FIG. 1 of this disclosure with changes as noted below. Supplemental reagents, when applied, were added directly to the sample bucket and manually mixed. Power settings for acoustic sonication and the electrochemical oxidation cell were not for each run when components were utilized indicated in the following for P-1, P-2, and P-3:

P-1: Ultrasound, BDD electro-chemical oxidation cell, and supplemental reagent consisting of 30 ml of Hydrogen peroxide and the entire sample adjusted to a pH of 4.0 using industrial grade concentrated sulfuric acid. A hydrodynamic nozzle was not used.

P-2: Hydrodynamic cavitation, electro-chemical oxidation cell, and supplemental reagent consisting of 30 ml of Hydrogen peroxide and the entire sample was adjusted to a pH of 4.0 using industrial grade concentrated sulfuric acid P-3: Hydrodynamic cavitation nozzle, ultrasound, BDD electro-chemical oxidation cell, and supplement reagents consisting of 30 ml of Hydrogen peroxide and the entire sample adjusted to a pH of 4.0 using industrial grade concentrated sulfuric acid, but where 15 ml of hydrogen peroxide was added at T=0 minutes, and 15 ml were added at T=10 minutes.

All treatment runs were processed through the disclosed system at a rate of 1.5 gpm for a period of 20 minutes with a 35 psi differential across the hydrodynamic cavitation nozzle into the cavitation reactor when the nozzle was utilized. The resultant data shows the importance of the combined treatment effects on PFAS when all key critical components of the disclosed technology are implemented. Notably, the PFAS concentrations of treatment P-3 met the U.S. Environmental Protection Agency's 70 ng/L (ppt) PFAS advisory level for drinking water as well as some other very low ppt limits that are being contemplated by various states and POTWs for pre-treatment standards.

Example 5

TABLE 6

PFAS Destruction in Spent Granular Activated Carbon

| Analyte Parameter | Units | Untreated Spent GAC Result | GAC - 1 Result | GAC - 1 % Destruction | GAC - 2 Result | GAC - 2 % Destruction |
|---|---|---|---|---|---|---|
| | | PFAS | | | | |
| PERFLUOROOCTANOIC ACID (PFOA) | mg/Kg | 0.0325 | 0.0138 | 57.5% | <0.015 | >53.8% |
| PERFLUOROOCTANESULFONIC ACID (PFOS) | mg/Kg | 0.161 | <0.015 | >90.7% | <0.015 | >90.7% |
| PERFLUORONONANOIC ACID (PFNA) | mg/Kg | <0.01 | <0.015 | — | <0.015 | — |
| PERFLUOROHEXANESULFONIC ACID (PFHXS) | mg/Kg | <0.02 | <0.03 | — | <0.03 | — |
| PERFLUOROHEPTANOIC ACID (PFHPA) | mg/Kg | <0.01 | <0.015 | — | <0.015 | — |
| PERFLUOROBUTANESULFONIC ACID (PFBS) | mg/Kg | <0.04 | <0.06 | — | <0.06 | — |

A treatability study using the disclosed technology to treat PFAS in spent granular activated carbon was performed on media obtained from a refinery where it was used to remove PFAS and other petroleum hydrocarbons from wastewater stream. Over 100 lbs. of spent coconut-based carbon was obtained for the study. The treatment system configuration used in the study was consistent with that depicted in FIG. 6A-2 of this disclosure. The treatment system 100 was the same as that used in the other previously presented Examples. The carbon absorber 50 consisted of a stainless-steel bag filter housing fitted with screens 48 to retain the carbon media during treatment. 50 lbs. of spent carbon were processed in each of the treatment studies (GAC-1 and GAC-2). Treatment system 100 included: hydrodynamic cavitation, acoustic cavitation, one BDD electro-chemical cell, a sinusoidal mixer, and supplemental reagents, all consistent with the disclosed technology. For each treatment run, 20 gallons of clean water was added to the system and recirculated in an up-flow direction through the absorber 48 at a flow rate of 1.5 gpm to fully saturate the spent carbon and purge air from treatment system 400 components During processing, hydrodynamic cavitation was maintained at with a 40-psi feed pressure differential between the cavitation nozzle and the cavitation reactor. Ultrasound utilized two opposing pairs of transducers with 40 kHz and 68 kHz frequencies, and 500 W of power was applied to each pair at 100% modulation. Supplemental reagents consisting of 1000 ml of 35% hydrogen peroxide was added to the mix tank 46 of system 100 that contained the 20 gallons of clean water, after backflow purging was complete. The pH of the tank was then adjusted to a pH of 4.0 S.U. with industrial grade sulfuric acid and the tank was mixed by recirculation pumping through system 100 while by-passing carbon cell 50. When pH stabilized at 4.0 S.U. in the mix tank, the treatment system was activated and flow was directed up through the cell back to the treatment system, then to the mix tank, and then pumped from the mix tank to the carbon cell at the steady flow of 1.5 gpm. Both GAC-1 and GAC-2 were treated and processed in the same replicate manner. The process was operated for 30 minutes and then halted, and the fluids were drained by gravity. The carbon was removed from the cell and mixed prior to sampling for analytical testing. No additional dewatering or drying was performed, and the lab analyzed the samples as received. The resultant data indicates the present technology will treat PFAS in spent activated carbon to below the analytical detection limit for PFAS in activated carbon, and when that carbon also contained an unknown amount of concentration of petroleum carbons.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system for treating oxidizable matter, the system comprising:
    a conduit configured to receive an aqueous fluid;
    a cavitation reactor having (+1) an inlet in fluid communication with the conduit and configured to receive the aqueous fluid from the conduit, and (ii) an outlet opposite the inlet, the cavitation reactor comprising:
        a cavitation nozzle fluidically coupled to the inlet, the cavitation nozzle comprising a shell and a tip disposed within the shell, wherein the shell has a first cross-sectional dimension, and wherein the tip is fixedly attached to and extends from an inner surface of the shell, such that the tip defines an orifice having a second cross-sectional dimension smaller than the first cross-sectional dimension, wherein a difference between the first and second cross-sectional dimensions is configured to cause a pressure differential of at least 25 pounds per square inch (psi) for the aqueous fluid flowing from the shell through the orifice,
        a cavitation chamber downstream of the cavitation nozzle, wherein the cavitation chamber has a third cross-sectional dimension larger than the first cross-sectional dimension, wherein a difference between the first and third cross-sectional dimensions is configured to cause cavitation bubbles to form within the aqueous fluid flowing from the cavitation nozzle to the cavitation chamber, and
        transducers surrounding at least a portion of the cavitation chamber and extending along a length of the cavitation chamber, wherein the transducers are configured to convert electrical energy to acoustic energy and transmit the acoustic energy toward the cavitation chamber; and
    an electrochemical oxidation reactor in fluid communication with the cavitation reactor, wherein the electrochemical oxidation reactor is configured to be electrically connected to a power source.

2. The system of claim 1, wherein the cavitation reactor is configured to be oriented vertically in operation such that the inlet is below the outlet and the aqueous fluid flows upward from the inlet through the shell and the tip to the cavitation chamber.

3. The system of claim 1, wherein the electrochemical oxidation reactor is a first electrochemical oxidation reactor downstream of the cavitation reactor, the system further comprising a second electrochemical oxidation reactor upstream of and in fluid communication with the cavitation reactor.

4. The system of claim 3, further comprising an in-line static mixer upstream of and in fluid communication with the second electrochemical oxidation reactor.

5. The system of claim 4, further comprising a manifold in fluid communication with the conduit and the static mixer, the manifold comprising a plurality of process components in parallel to one another and configured to receive a reagent.

6. The system of claim 4, wherein the mixer comprises a mix tank, a hydrodynamic mixer, or a mixing reactor.

7. The system of claim 1, wherein the electrochemical oxidation reactor is a first electrochemical oxidation reactor upstream of the cavitation reactor, the system further comprising:
    a first mixer upstream of and fluidically coupled to the first electrochemical reactor;
    a second mixer downstream of the cavitation reactor; and
    a second electrochemical oxidation reactor downstream of the second mixer.

8. The system of claim 7, wherein at least one of the first mixer or the second mixer comprises a channel including a curvature and/or one or more turns.

9. The system of claim 7, wherein at least one of the first mixer or the second mixer is a static mixer without moving parts.

10. The system of claim 9, wherein at least one of the first mixer or the second mixer comprises a channel comprising a curvature and/or one or more turns.

11. A system for treating oxidizable matter, the system comprising:
    a conduit configured to receive an aqueous fluid including oxidizable matter;
    a cavitation reactor having (i) an inlet in fluid communication with the conduit and configured to receive the aqueous fluid and (ii) an outlet opposite the inlet, the cavitation reactor comprising:
        a cavitation nozzle fluidically coupled to the inlet, the cavitation nozzle comprising a shell and a tip disposed within the shell,
        wherein the shell has a first cross-sectional dimension, and wherein the tip is fixedly attached to and extends inwardly from an inner surface of the shell, such that the tip defines an orifice having a second cross-sectional dimension smaller than the first cross-sectional dimension,
        a cavitation chamber downstream of the cavitation nozzle,
        wherein the cavitation chamber has a third cross-sectional dimension larger than the first cross-sectional dimension, and
        wherein a difference between the first and third cross-sectional dimensions is configured to cause cavitation bubbles to form within the aqueous fluid flowing from the cavitation nozzle to the cavitation chamber, and transducers surrounding at least a portion of the cavitation chamber and extending along a length of the cavitation chamber, wherein the transducers are configured to convert electrical energy to acoustic energy and transmit the acoustic energy toward the cavitation chamber;

a first mixer upstream of and fluidically coupled to the cavitation reactor, wherein the first mixer comprises a channel comprising a curvature and one or more turns;

a second mixer downstream of and fluidically coupled to the cavitation reactor, wherein the second mixer comprises a channel comprising a curvature and one or more turns; and an electrochemical oxidation reactor downstream of the first mixer and in fluid communication with the cavitation reactor.

12. The system of claim 11, wherein the electrochemical oxidation reactor is a first electrochemical oxidation reactor upstream of the cavitation reactor, the system further comprising a second electrochemical oxidation reactor downstream of the second mixer.

* * * * *